(12) United States Patent
Agarwal et al.

(10) Patent No.: US 9,729,387 B2
(45) Date of Patent: Aug. 8, 2017

(54) LINK AGGREGATION IN SOFTWARE-DEFINED NETWORKS

(71) Applicant: BROCADE COMMUNICATIONS SYSTEMS, INC., San Jose, CA (US)

(72) Inventors: Vivek Agarwal, Campbell, CA (US); Arvindsrinivasan Lakshminarasimhan, San Jose, CA (US); Kashyap Tavarekere Ananthapadmanabha, San Jose, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 103 days.

(21) Appl. No.: 14/625,536

(22) Filed: Feb. 18, 2015

(65) Prior Publication Data

US 2015/0172098 A1  Jun. 18, 2015

Related U.S. Application Data

(63) Continuation of application No. 13/742,207, filed on Jan. 15, 2013, now Pat. No. 8,995,272.

(Continued)

(51) Int. Cl.
*H04L 12/24* (2006.01)
*H04L 12/801* (2013.01)
(Continued)

(52) U.S. Cl.
CPC ........ *H04L 41/0654* (2013.01); *H04L 45/245* (2013.01); *H04L 47/10* (2013.01); *H04L 49/25* (2013.01); *Y02B 60/33* (2013.01)

(58) Field of Classification Search
CPC . H04L 12/2613; H04L 12/2605; H04L 49/15; H04L 49/35; H04L 67/00;
(Continued)

(56) References Cited

U.S. PATENT DOCUMENTS 5,390,173 A   2/1995  Spinney
5,802,278 A   9/1998  Isfeld
(Continued)

FOREIGN PATENT DOCUMENTS

CN   1735062      2/2006
CN   101064682    10/2007
(Continued)

OTHER PUBLICATIONS

Office Action dated Jun. 18, 215, U.S. Appl. No. 13/098,490, filed May 2, 2011.
(Continued)

*Primary Examiner* — Benjamin H Elliott, IV
(74) *Attorney, Agent, or Firm* — Shun Yao; Park, Vaughan, Fleming & Dowler LLP

(57) ABSTRACT

One embodiment of the present invention provides a switch capable of processing software-defined data flows. The switch includes an identifier management module and a flow definition management module. During operation, the identifier management module allocates a logical identifier to a link aggregation port group which includes a plurality of ports associated with different links. The flow definition management module processes a flow definition corresponding to the logical identifier, applies the flow definition to ports in the link aggregation port group, and update lookup information for the link aggregation port group based on the flow definition.

20 Claims, 13 Drawing Sheets

Related U.S. Application Data

(60) Provisional application No. 61/591,227, filed on Jan. 26, 2012, provisional application No. 61/658,330, filed on Jun. 11, 2012.

(51) Int. Cl.
*H04L 12/709* (2013.01)
*H04L 12/947* (2013.01)

(58) Field of Classification Search
CPC ....... H04L 45/245; H04L 47/41; H04L 47/10; H04L 47/2441
See application file for complete search history.

(56) References Cited

U.S. PATENT DOCUMENTS

| | | | |
|---|---|---|---|
| 5,878,232 A | 3/1999 | Marimuthu | |
| 5,959,968 A | 9/1999 | Chin | |
| 5,973,278 A | 10/1999 | Wehrill, III | |
| 5,983,278 A | 11/1999 | Chong | |
| 6,041,042 A | 3/2000 | Bussiere | |
| 6,085,238 A | 7/2000 | Yuasa | |
| 6,104,696 A | 8/2000 | Kadambi | |
| 6,185,214 B1 | 2/2001 | Schwartz | |
| 6,185,241 B1 | 2/2001 | Sun | |
| 6,331,983 B1 | 12/2001 | Haggerty | |
| 6,438,106 B1 | 8/2002 | Pillar | |
| 6,498,781 B1 | 12/2002 | Bass | |
| 6,542,266 B1 | 4/2003 | Phillips | |
| 6,633,761 B1 | 10/2003 | Singhal | |
| 6,771,610 B1 | 8/2004 | Seaman | |
| 6,870,840 B1 | 3/2005 | Hill | |
| 6,873,602 B1 | 3/2005 | Ambe | |
| 6,937,576 B1 | 8/2005 | DiBenedetto | |
| 6,956,824 B2 | 10/2005 | Mark | |
| 6,957,269 B2 | 10/2005 | Williams | |
| 6,975,581 B1 | 12/2005 | Medina | |
| 6,975,864 B2 | 12/2005 | Singhal | |
| 7,016,352 B1 | 3/2006 | Chow | |
| 7,061,877 B1 | 6/2006 | Gummalla | |
| 7,173,934 B2 | 2/2007 | Lapuh | |
| 7,197,308 B2 | 3/2007 | Singhal | |
| 7,206,288 B2 | 4/2007 | Cometto | |
| 7,310,664 B1 | 12/2007 | Merchant | |
| 7,313,637 B2 | 12/2007 | Tanaka | |
| 7,315,545 B1 | 1/2008 | Chowdhury et al. | |
| 7,316,031 B2 | 1/2008 | Griffith | |
| 7,330,897 B2 | 2/2008 | Baldwin | |
| 7,380,025 B1 | 5/2008 | Riggins | |
| 7,397,794 B1 | 7/2008 | Lacroute | |
| 7,430,164 B2 | 9/2008 | Bare | |
| 7,453,888 B2 | 11/2008 | Zabihi | |
| 7,477,894 B1 | 1/2009 | Sinha | |
| 7,480,258 B1 | 1/2009 | Shuen | |
| 7,508,757 B2 | 3/2009 | Ge | |
| 7,558,195 B1 | 7/2009 | Kuo | |
| 7,558,273 B1 | 7/2009 | Grosser | |
| 7,571,447 B2 | 8/2009 | Ally | |
| 7,599,901 B2 | 10/2009 | Mital | |
| 7,688,736 B1 | 3/2010 | Walsh | |
| 7,688,960 B1 | 3/2010 | Aubuchon | |
| 7,690,040 B2 | 3/2010 | Frattura | |
| 7,706,255 B1 | 4/2010 | Kondrat et al. | |
| 7,716,370 B1 | 5/2010 | Devarapalli | |
| 7,720,076 B2 | 5/2010 | Dobbins | |
| 7,729,296 B1 | 6/2010 | Choudhary | |
| 7,787,480 B1 | 8/2010 | Mehta | |
| 7,792,920 B2 | 9/2010 | Istvan | |
| 7,796,593 B1 | 9/2010 | Ghosh | |
| 7,808,992 B2 | 10/2010 | Homchaudhuri | |
| 7,836,332 B2 | 11/2010 | Hara | |
| 7,843,906 B1 | 11/2010 | Chidambaram et al. | |
| 7,843,907 B1 | 11/2010 | Abou-Emara | |
| 7,860,097 B1 | 12/2010 | Lovett | |
| 7,898,959 B1 | 3/2011 | Arad | |
| 7,912,091 B1 | 3/2011 | Krishnan | |
| 7,924,837 B1 | 4/2011 | Shabtay | |
| 7,937,438 B1 | 5/2011 | Miller | |
| 7,937,756 B2 | 5/2011 | Kay | |
| 7,945,941 B2 | 5/2011 | Sinha | |
| 7,949,638 B1 | 5/2011 | Goodson | |
| 7,957,386 B1 | 6/2011 | Aggarwal | |
| 8,018,938 B1 | 9/2011 | Fromm | |
| 8,027,354 B1 | 9/2011 | Portolani | |
| 8,054,832 B1 | 11/2011 | Shukla | |
| 8,068,442 B1 | 11/2011 | Kompella | |
| 8,078,704 B2 | 12/2011 | Lee | |
| 8,090,805 B1 | 1/2012 | Chawla | |
| 8,102,781 B2 | 1/2012 | Smith | |
| 8,102,791 B2 | 1/2012 | Tang | |
| 8,116,307 B1 | 2/2012 | Thesayi | |
| 8,125,928 B2 | 2/2012 | Mehta | |
| 8,134,922 B2 | 3/2012 | Elangovan | |
| 8,155,150 B1 | 4/2012 | Chung | |
| 8,160,063 B2 | 4/2012 | Maltz | |
| 8,160,080 B1 | 4/2012 | Arad | |
| 8,170,038 B2 | 5/2012 | Belanger | |
| 8,175,107 B1 | 5/2012 | Yalagandula | |
| 8,194,674 B1 | 6/2012 | Pagel | |
| 8,195,774 B2 | 6/2012 | Lambeth | |
| 8,204,061 B1 | 6/2012 | Sane | |
| 8,213,313 B1 | 7/2012 | Doiron | |
| 8,213,336 B2 | 7/2012 | Smith | |
| 8,230,069 B2 | 7/2012 | Korupolu | |
| 8,239,960 B2 | 8/2012 | Frattura | |
| 8,249,069 B2 | 8/2012 | Raman | |
| 8,270,401 B1 | 9/2012 | Barnes | |
| 8,295,291 B1 | 10/2012 | Ramanathan | |
| 8,295,921 B2 | 10/2012 | Wang | |
| 8,301,686 B1 | 10/2012 | Appajodu | |
| 8,339,994 B2 | 12/2012 | Gnanasekaran | |
| 8,351,352 B1 | 1/2013 | Eastlake | |
| 8,369,335 B2 | 2/2013 | Jha | |
| 8,369,347 B2 | 2/2013 | Xiong | |
| 8,392,496 B2 | 3/2013 | Linden | |
| 8,451,717 B2 | 5/2013 | Venkataraman | |
| 8,462,774 B2 | 6/2013 | Page | |
| 8,467,375 B2 | 6/2013 | Blair | |
| 8,520,595 B2 | 8/2013 | Yadav | |
| 8,599,850 B2 | 12/2013 | Jha | |
| 8,599,864 B2 | 12/2013 | Chung | |
| 8,615,008 B2 | 12/2013 | Natarajan | |
| 8,619,788 B1 | 12/2013 | Sankaran | |
| 8,705,526 B1 | 4/2014 | Hasan | |
| 8,706,905 B1 | 4/2014 | McGlaughlin | |
| 8,717,895 B2 | 5/2014 | Koponen | |
| 8,724,456 B1 | 5/2014 | Hong | |
| 8,804,736 B1 | 8/2014 | Drake | |
| 8,806,031 B1 | 8/2014 | Kondur | |
| 8,826,385 B2 | 9/2014 | Congdon | |
| 8,918,631 B1 | 12/2014 | Kumar | |
| 8,937,865 B1 | 1/2015 | Kumar | |
| 8,995,272 B2 * | 3/2015 | Agarwal | H04L 45/245 370/230 |
| 9,178,793 B1 | 11/2015 | Marlow | |
| 9,438,447 B2 | 9/2016 | Basso | |
| 2001/0005527 A1 | 6/2001 | Vaeth | |
| 2001/0055274 A1 | 12/2001 | Hegge | |
| 2002/0019904 A1 | 2/2002 | Katz | |
| 2002/0021701 A1 | 2/2002 | Lavian | |
| 2002/0039350 A1 | 4/2002 | Wang | |
| 2002/0054593 A1 | 5/2002 | Morohashi | |
| 2002/0087723 A1 | 7/2002 | Williams | |
| 2002/0091795 A1 | 7/2002 | Yip | |
| 2003/0026290 A1 | 2/2003 | Umayabashi | |
| 2003/0041085 A1 | 2/2003 | Sato | |
| 2003/0097470 A1 | 5/2003 | Lapuh | |
| 2003/0123393 A1 | 7/2003 | Feuerstraeter | |
| 2003/0147385 A1 | 8/2003 | Montalvo | |
| 2003/0174706 A1 | 9/2003 | Shankar | |
| 2003/0189905 A1 | 10/2003 | Lee | |
| 2003/0208616 A1 | 11/2003 | Laing | |
| 2003/0216143 A1 | 11/2003 | Roese | |
| 2004/0001433 A1 | 1/2004 | Gram | |

(56) References Cited

U.S. PATENT DOCUMENTS

| | | |
|---|---|---|
| 2004/0003094 A1 | 1/2004 | See |
| 2004/0010600 A1 | 1/2004 | Baldwin |
| 2004/0049699 A1 | 3/2004 | Griffith |
| 2004/0057430 A1 | 3/2004 | Paavolainen |
| 2004/0081171 A1 | 4/2004 | Finn |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2005/0007951 A1 | 1/2005 | Lapuh |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0029055 A1 | 2/2006 | Perera |
| 2006/0034292 A1 | 2/2006 | Wakayama |
| 2006/0036765 A1 | 2/2006 | Weyman |
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0098589 A1 | 5/2006 | Kreeger |
| 2006/0126511 A1 | 6/2006 | Youn |
| 2006/0140130 A1 | 6/2006 | Kalkunte |
| 2006/0168109 A1 | 7/2006 | Warmenhoven |
| 2006/0184937 A1 | 8/2006 | Abels |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2007/0036178 A1 | 2/2007 | Hares |
| 2007/0053294 A1 | 3/2007 | Ho |
| 2007/0061817 A1 | 3/2007 | Atkinson |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1* | 8/2007 | Narayanan ............ H04L 49/357 370/216 |
| 2007/0206762 A1 | 9/2007 | Chandra |
| 2007/0211712 A1 | 9/2007 | Fitch |
| 2007/0226214 A1 | 9/2007 | Smits |
| 2007/0258449 A1 | 11/2007 | Bennett |
| 2007/0274234 A1 | 11/2007 | Kubota |
| 2007/0289017 A1 | 12/2007 | Copeland, III |
| 2008/0052487 A1 | 2/2008 | Akahane |
| 2008/0056135 A1 | 3/2008 | Lee |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112400 A1 | 5/2008 | Dunbar et al. |
| 2008/0133760 A1 | 6/2008 | Berkvens |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285458 A1 | 11/2008 | Lysne |
| 2008/0285555 A1 | 11/2008 | Ogasahara |
| 2008/0298248 A1 | 12/2008 | Roeck |
| 2008/0304498 A1 | 12/2008 | Jorgensen |
| 2008/0310342 A1 | 12/2008 | Kruys |
| 2009/0022069 A1 | 1/2009 | Khan |
| 2009/0037607 A1 | 2/2009 | Farinacci |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0106405 A1 | 4/2009 | Mazarick |
| 2009/0116381 A1 | 5/2009 | Kanda |
| 2009/0129384 A1 | 5/2009 | Regan |
| 2009/0138577 A1 | 5/2009 | Casado |
| 2009/0138752 A1 | 5/2009 | Graham |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0232031 A1 | 9/2009 | Vasseur |
| 2009/0245137 A1 | 10/2009 | Hares |
| 2009/0245242 A1 | 10/2009 | Carlson |
| 2009/0246137 A1 | 10/2009 | Hadida Ruah et al. |
| 2009/0252049 A1 | 10/2009 | Ludwig |
| 2009/0252061 A1 | 10/2009 | Small |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0027420 A1 | 2/2010 | Smith |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |

(56) References Cited

U.S. PATENT DOCUMENTS

| | | |
|---|---|---|
| 2010/0182920 A1 | 7/2010 | Matsuoka |
| 2010/0189119 A1 | 7/2010 | Sawada |
| 2010/0195489 A1 | 8/2010 | Zhou |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0287262 A1 | 11/2010 | Elzur |
| 2010/0287548 A1 | 11/2010 | Zhou |
| 2010/0290464 A1 | 11/2010 | Assarpour |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0019678 A1 | 1/2011 | Mehta |
| 2011/0032945 A1 | 2/2011 | Mullooly |
| 2011/0035489 A1 | 2/2011 | Mcdaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085563 A1 | 4/2011 | Kotha |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe et al. |
| 2011/0142062 A1 | 6/2011 | Wang |
| 2011/0161494 A1 | 6/2011 | Mcdysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0274114 A1 | 11/2011 | Dhar |
| 2011/0280572 A1 | 11/2011 | Vobbilisetty |
| 2011/0286457 A1 | 11/2011 | Ee |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob Da Silva et al. |
| 2012/0033668 A1 | 2/2012 | Humphries |
| 2012/0033669 A1 | 2/2012 | Mohandas |
| 2012/0033672 A1 | 2/2012 | Page |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0230225 A1 | 9/2012 | Matthews |
| 2012/0243539 A1 | 9/2012 | Keesara |
| 2012/0250502 A1* | 10/2012 | Brolin ............... H04L 47/31 370/230 |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0287785 A1 | 11/2012 | Kamble |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai |
| 2012/0327937 A1 | 12/2012 | Melman et al. |
| 2013/0003535 A1 | 1/2013 | Sarwar |
| 2013/0003549 A1* | 1/2013 | Matthews ........... H04L 41/0668 370/235 |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0124707 A1 | 5/2013 | Ananthapadmanabha |
| 2013/0127848 A1 | 5/2013 | Joshi |
| 2013/0136123 A1 | 5/2013 | Ge |
| 2013/0148546 A1 | 6/2013 | Eisenhauer |
| 2013/0194914 A1 | 8/2013 | Agarwal |
| 2013/0219473 A1 | 8/2013 | Schaefer |
| 2013/0223221 A1 | 8/2013 | Xu |
| 2013/0250951 A1 | 9/2013 | Koganti |
| 2013/0250958 A1* | 9/2013 | Watanabe ............ H04L 45/54 370/392 |
| 2013/0259037 A1 | 10/2013 | Natarajan |
| 2013/0272135 A1 | 10/2013 | Leong |
| 2013/0294451 A1 | 11/2013 | Li |
| 2013/0301425 A1 | 11/2013 | Udutha |
| 2013/0301642 A1 | 11/2013 | Radhakrishnan |
| 2013/0322427 A1 | 12/2013 | Stiekes |
| 2013/0346583 A1 | 12/2013 | Low |
| 2014/0013324 A1 | 1/2014 | Zhang |

(56) References Cited

U.S. PATENT DOCUMENTS

| | | | |
|---|---|---|---|
| 2014/0025736 | A1 | 1/2014 | Wang |
| 2014/0044126 | A1 | 2/2014 | Sabhanatarajan |
| 2014/0056298 | A1 | 2/2014 | Vobbilisetty |
| 2014/0059225 | A1 | 2/2014 | Gasparakis |
| 2014/0086253 | A1 | 3/2014 | Yong |
| 2014/0105034 | A1 | 4/2014 | Sun |
| 2014/0258446 | A1 | 9/2014 | Bursell |
| 2014/0269720 | A1 | 9/2014 | Srinivasan |
| 2014/0269733 | A1 | 9/2014 | Venkatesh |
| 2014/0355477 | A1 | 12/2014 | Velayudhan |
| 2015/0010007 | A1 | 1/2015 | Matsuhira |
| 2015/0030031 | A1 | 1/2015 | Zhou |
| 2015/0143369 | A1 | 5/2015 | Zheng |
| 2015/0172098 | A1* | 6/2015 | Agarwal ............... H04L 45/245 370/217 |

FOREIGN PATENT DOCUMENTS

| | | |
|---|---|---|
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102415065 | 4/2012 |
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 1916807 A2 | 4/2008 |
| EP | 2001167 A1 | 10/2008 |
| EP | 2874359 | 5/2015 |
| JP | WO 2012093429 A1 * | 7/2012 ............ H04L 45/54 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2014031781 | 2/2014 |

OTHER PUBLICATIONS

Office Action dated Jun. 16, 2015, U.S. Appl. No. 13/048,817, filed Mar. 15, 2011.
Touch, J. et al., Transparent Interconnection of Lots of Links (TRILL): Problem and Applicability Statement, May 2009, Network Working Group, pp. 1-17.
Zhai F. Hu et al. 'RBridge: Pseudo-Nickname; draft-hu-trill-pseudonode-nickname-02.txt', May 15, 2012.
Office Action dated Jul. 13, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438 filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Eastlake, D. et al., 'RBridges: TRILL Header Options', Dec. 24, 2009, pp. 1-17, TRILL Working Group.
Perlman, Radia et al., 'RBridge VLAN Mapping', TRILL Working Group, Dec. 4, 2009, pp. 1-12.
Touch, J. et al., 'Transparent Interconnection of Lots of Links (TRILL): Problem and Applicability Statement', May 2009, Network Working Group, pp. 1-17.
'RBridges: Base Protocol Specification', IETF Draft, Perlman et al., Jun. 26, 2009.
'Switched Virtual Networks. Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.
Office action dated Aug. 29, 2014, U.S. Appl. No. 13/042,259, filed Mar. 7, 2011.
Office Action dated Mar. 14, 2014, U.S. Appl. No. 13/092,460, filed Apr. 22, 2011.
Office action dated Aug. 21, 2014, U.S. Appl. No. 13/184,526, filed Jul. 16, 2011.
Office Action dated Mar. 6, 2014, U.S. Appl. No. 13/425,238, filed Mar. 20, 2012.
Office Action dated Feb. 28, 2014, U.S. Appl. No. 13/351,513, filed Jan. 17, 2012.
Brocade, 'Brocade Fabrics OS (FOS) 6.2 Virtual Fabrics Feature Frequently Asked Questions', pp. 1-6, 2009 Brocade Communications Systems, Inc.
Brocade, 'FastIron and TurboIron 24x Configuration Guide', Feb. 16, 2010.
Brocade, 'The Effortless Network: Hyperedge Technology for the Campus LAN' 2012.
Brocade 'An Introduction to Brocade VCS Fabric Technology', Dec. 3, 2012.
Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Knight, 'Network Based IP VPN Architecture using Virtual Routers', May 2003.

(56) References Cited

OTHER PUBLICATIONS

Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004 (Jun. 1, 2004), pp. 124-131, XP001198207, ISSN: 0163-6804, DOI: 10.1109/MCOM.2004.1304248.
Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].
Lapuh, Roger et al., 'Split Multi-Link Trunking (SMLT)', Network Working Group, Oct. 2012.
Lapuh, Roger et al., 'Split Multi-link Trunking (SMLT) draft-lapuh-network-smlt-08', Jan. 2009.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-narten-n vo3-over l ay-problem-statement-01', Oct. 31, 2011.
Office Action for U.S. Appl. No. 13/042,259, filed Mar. 7, 2011, from Jaroenchonwanit, Bunjob, dated Jan. 16, 2014.
Office Action for U.S. Appl. No. 13/092,752, filed Apr. 22, 2011, from Park, Jung H., dated Jul. 18, 2013.
Office Action for U.S. Appl. No. 13/365,993, filed Feb. 3, 2012, from Cho, Hong Sol., dated Jul. 23, 2013.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/533,843, filed Jun. 26, 2012, dated Oct. 21, 2013.
Office Action for U.S. Appl. No. 13/598,204, filed Aug. 29, 2012, dated Feb. 20, 2014.
Perlman, Radia et al., 'Challenges and Opportunities in the Design of TRILL: a Routed layer 2 Technology', 2009.
S. Nadas et al., 'Virtual Router Redundancy Protocol (VRRP) Version 3 for IPv4 and IPv6', Internet Engineering Task Force, Mar. 2010.
Office Action dated Apr. 9, 2014, U.S. Appl. No. 13/092,724, filed Apr. 22, 2011.
Office Action dated Mar. 26, 2014, U.S. Appl. No. 13/092,701, filed Apr. 22, 2011.
Office Action dated Apr. 9, 2014, U.S. Appl. No. 13/092,752, filed Apr. 22, 2011.
Office Action dated Jun. 18, 2014, U.S. Appl. No. 13/440,861, filed Apr. 5, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Huang, Nen-Fu et al., 'An Effective Spanning Tree Algorithm for a Bridged LAN', Mar. 16, 1992.
Lapuh, Roger et al., 'Split Multi-link Trunking (SMLT)', draft-lapuh-network-smlt-08, Jul. 2008.
Office Action for U.S. Appl. No. 13/098,490, filed May 2, 2011, dated Mar. 27, 2014.
Perlman, Radia et al., 'RBridges: Base Protocol Specification; Draft-ietf-trill-rbridge-protocol-16.txt', Mar. 3, 2010, pp. 1-117.
'An Introduction to Brocade VCS Fabric Technology', Brocade white paper, http://community.brocade.com/docs/DOC-2954, Dec. 3, 2012.
U.S. Appl. No. 13/030,806 Office Action dated Dec. 3, 2012.
Office action dated Jan. 10, 2014, U.S. Appl. No. 13/092,580, filed Apr. 22, 2011.
Office action dated Jan. 16, 2014, U.S. Appl. No. 13/042,259, filed Mar. 7, 2011.
Office action dated Jul. 31, 2013, U.S. Appl. No. 13/042,259, filed Mar. 7, 2011.
Office action dated Jan. 6, 2014, U.S. Appl. No. 13/092,877, filed Apr. 22, 2011.

(56) References Cited

OTHER PUBLICATIONS

Office action dated Oct. 2, 2013, U.S. Appl. No. 13/044,326, filed Mar. 9, 2011.
Office action dated Dec. 2, 2013, U.S. Appl. No. 13/184,526, filed Jul. 16, 2011.
Office action dated Nov. 29, 2013, U.S. Appl. No. 13/092,873, filed Apr. 22, 2011.
Office action dated Nov. 12, 2013, U.S. Appl. No. 13/312,903, filed Dec. 6, 2011.
BROCADE Brocade Unveils The Effortless Network, http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Office Action for U.S. Appl. No. 13/365,808, filed date Jul. 18, 2013, dated Jul. 18, 2013.
Office Action for U.S. Appl. No. 13/092,887, dated Jan. 6, 2014.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Feb. 5, 2013, U.S. Appl. No. 13/092,724, filed Apr. 22, 2011.
Office action dated Jun. 10, 2013, U.S. Appl. No. 13/092,580, filed Apr. 22, 2011.
Office action dated Mar. 18, 2013, U.S. Appl. No. 13/042,259, filed Mar. 7, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Jul. 3, 2013, U.S. Appl. No. 13/092,701, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office action dated Jun. 13, 2013, U.S. Appl. No. 13/312,903, filed Dec. 6, 2011.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Office Action for U.S. Appl. No. 13/087,239, filed date Apr. 14, 2011, dated Dec. 5, 2012.
Office Action for U.S. Appl. No. 13/351,513, filed Jan. 17, 2012, dated Feb. 28, 2014.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.

(56) References Cited

OTHER PUBLICATIONS

Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/786,328, filed Mar. 5, 2013, dated Mar. 13, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Rosen, E. et al., "BGP/MPLS VPNs", Mar. 1999.
Office Action for U.S. Appl. No. 13/425,238, filed Mar. 20, 2012, dated Mar. 12, 2015.
Office Action for U.S. Appl. No. 14/577,785, filed Dec. 19, 2014, dated Apr. 13, 2015.
Mahalingam "VXLAN: A Framework for Overlaying Virtualized Layer 2 Networks over Layer 3 Networks" Oct. 17, 2013 pp. 1-22, Sections 1, 4 and 4.1.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438, filed Oct. 19, 2012.
Office action dated Jun. 8, 2015, U.S. Appl. No. 14/178,042, filed Feb. 11, 2014.
Office Action Dated Jun. 10, 2015, U.S. Appl. No. 13/890,150, filed May 8, 2013.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
Yang Yu et al "A Framework of using OpenFlow to handle transient link failure", TMEE, 2011 International Conference on, IEEE, Dec. 16, 2011.
Office Action for U.S. Appl. No. 15/227,789 dated Feb. 27, 2017.
Office Action for U.S. Appl. No. 14/822,380 dated Feb. 8, 2017.
Office Action for U.S. Appl. No. 14/704,660 dated Feb. 27, 2017.
Office Action for U.S. Appl. No. 14/510,913 dated Mar. 3, 2017.
Office Action for U.S. Appl. No. 14/473,941 dated Feb. 8, 2017.
Office Action for U.S. Appl. No. 14/329,447 dated Feb. 10, 2017.

* cited by examiner

LINK AGGREGATION IN SOFTWARE-DEFINED NETWORKS

RELATED APPLICATIONS

This application is a continuation of U.S. application Ser. No. 13/742,207, titled "Link Aggregation in Software-Defined Networks", by inventors Vivek Agarwal, Arvindsrinivasan Lakshminarasimhan, and Kashyap Tavarekere Ananthapadmanabha, filed 15 Jan. 2013, which claims the benefit of U.S. Provisional Application No. 61/591,227, titled "Building Redundancy into OpenFlow Enabled Network using Multi-Chassis Trunking," by inventors Vivek Agarwal, Arvindsrinivasan Lakshminarasimhan, and Kashyap Tavarekere Ananthapadmanabha, filed 26 Jan. 2012; and U.S. Provisional Application No. 61/658,330, titled "High Availability and Facilitating Link Aggregation for OpenFlow," by inventors Vivek Agarwal, Arvindsrinivasan Lakshminarasimhan, and Kashyap Tavarekere Ananthapadmanabha, filed 11 Jun. 2012, the disclosures of which are incorporated by reference herein.

The present disclosure is related to U.S. patent application Ser. No. 12/725,249, titled "Redundant Host Connection in a Routed Network," by inventors Somesh Gupta, Anoop Ghanwani, Phanidhar Koganti, and Shunjia Yu, filed 16 Mar. 2010; and U.S. patent application Ser. No. 13/669,313, titled "System and Method for Flow Management in Software-Defined Networks," by inventors Kashyap Tavarekere Ananthapadmanabha, Vivek Agarwal, and Eswara S. P. Chinthalapati, filed 5 Nov. 2012, the disclosures of which are incorporated by reference herein.

BACKGROUND

Field

The present disclosure relates to network management. More specifically, the present disclosure relates to a method and system for facilitating link aggregation in a software-defined network.

Related Art

The exponential growth of the Internet has made it a popular delivery medium for heterogeneous data flows. Such heterogeneity has caused an increasing demand for bandwidth. As a result, equipment vendors race to build larger and faster switches with versatile capabilities, such as defining data flows using software, to move more traffic efficiently. However, the complexity of a switch cannot grow infinitely. It is limited by physical space, power consumption, and design complexity, to name a few factors. Furthermore, switches with higher and versatile capability are usually more complex and expensive.

Software-defined flow is a new paradigm in data communication networks. Any network supporting software-defined flows can be referred to as software-defined network. An example of a software-defined network can be an OpenFlow network, wherein a network administrator can configure how a switch behave based on data flows that can be defined across different layers of network protocols. A software-defined network separates the intelligence needed for controlling individual network devices (e.g., routers and switches) and offloads the control mechanism to a remote controller device (often a stand-alone server or end device). Therefore, a software-defined network provides complete control and flexibility in managing data flow in the network.

While support for software-defined flows brings many desirable features to networks, some issues remain unsolved in facilitating flow definitions for a link aggregation across one or more switches that support software-defined flows.

SUMMARY

One embodiment of the present invention provides a switch capable of processing software-defined data flows. The switch includes an identifier management module and a flow definition management module. During operation, the identifier management module allocates a logical identifier to a link aggregation port group which includes a plurality of ports associated with different links. The flow definition management module processes a flow definition corresponding to the logical identifier, applies the flow definition to ports in the link aggregation port group, and update lookup information for the link aggregation port group based on the flow definition.

In a variation on this embodiment, the flow definition management module incorporates in the lookup information a policy regarding traffic distribution across ports in the link aggregation port group.

In a variation on this embodiment, the switch also includes a high-availability module which detects the inability of a port in the link aggregation port group to forward traffic updates the lookup information to associate the flow definition one or more active ports in the link aggregation port group.

In a variation on this embodiment, the switch is an OpenFlow-capable switch.

One embodiment of the present invention provides a switch in a software-defined network. The switch includes an identifier management module, an election module configurable, and a flow definition management module. During operation, the identifier management module allocates a logical identifier to a link aggregation port group which includes a plurality of ports associated with different links. The election module elects a master switch in conjunction with a remote switch. The switch and the remote switch participate in the multi-switch link aggregation and have the same logical identifier allocated to the multi-switch link aggregation port group. The flow definition management module processes a flow definition corresponding to the logical identifier.

In a variation on this embodiment, the flow definition management module applies the flow definition to the ports in the multi-switch link aggregation and updates lookup information for the multi-switch link aggregation port group based on the flow definition.

In a variation on this embodiment, the flow definition management module communicates with a network controller. The switch also includes a synchronization module which sends the flow definition to the remote switch.

In a variation on this embodiment, the switch includes a synchronization module which receives the flow definition from the remote switch in response to the remote switch being elected as the master switch.

In a further variation, the switch includes a high-availability module which detects a failure associated with the remote switch. After the detection, the flow definition management module communicates with a network controller.

In a variation on this embodiment, the switch is an OpenFlow-capable switch.

BRIEF DESCRIPTION OF THE FIGURES

In the figures, like reference numerals refer to the same figure elements.

DETAILED DESCRIPTION

Figure 1A:
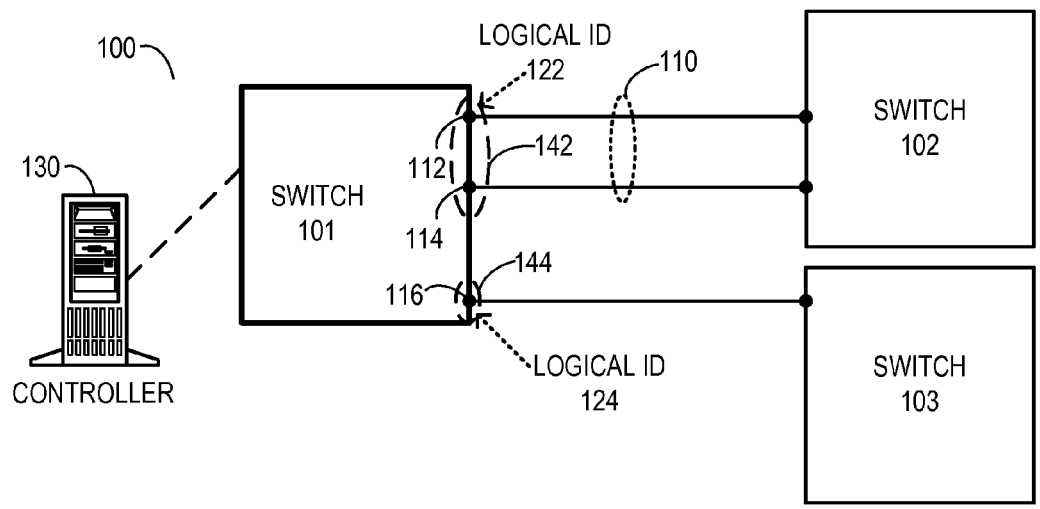
FIG. 1A illustrates an exemplary link aggregation in a heterogeneous software-defined network, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of facilitating single- and multi-chassis link aggregations for switches that support software-defined flows is solved by: (1) providing a logical identifier associated with a respective physical port or link aggregation to a controller for flow definition; and (2) synchronizing flow definitions between the switches, thereby allowing the switches to associate with a controller as a single switch.

It is often desirable to aggregate multiple links between switches or end devices in a network into a logical link aggregation (can also be referred to as a trunk) in a software-defined network. Such a link aggregation includes several links between one or more switches or end devices to create a single logical link and support increased bandwidth. The link aggregation can also provide high availability. If one of the links in the link aggregation fails, the switch associated with the link aggregation can automatically redistribute traffic across the active links in the link aggregation. Ideally, a controller, which is a standalone device providing the forwarding intelligence (i.e., the control plane) to a software-defined network, should provide flow definitions (such as those defined using OpenFlow) to the link aggregation. However, with the existing technologies, a flow definition is defined based on individual physical ports, regardless of whether it is configured for a link aggregation. Hence, a controller can generate erroneous and conflicting flow definitions associated with the ports in the link aggregation.

A second problem faced by the existing software-defined network architecture is providing high availability to the switches capable of processing software-defined flows. Because flow definitions are specific to a switch and its ports, with the existing technologies, a controller does not automatically provide high availability (e.g., switch redundancy). Consequently, a failure to a switch in a software-defined network can disrupt, and often disconnect, the network.

The solutions described herein to the above problems are two-fold. First, in a software-defined network, a switch capable of processing software-defined flows allocates a logical identifier to a respective port group of the switch. The port group includes an individual physical port of the switch or a group of ports in a link aggregation associated with the switch. The switch maintains a mapping between a respective logical identifier and the ports in the corresponding port group. The switch provides these logical identifiers to the controller in the software-defined network. The controller considers these logical identifiers to be the physical port identifiers. As a result, the controller provides flow definitions comprising the logical identifiers as input and/or output ports. Upon receiving a flow definition, the switch converts the flow definition based on the mapping and makes the flow definition applicable to the ports in the corresponding port group. In some embodiments, the switch further incorporates any local policy regarding the traffic distribution across the ports in the link aggregation in addition to the flow definition.

Second, in a software-defined network requiring high availability, a multi-chassis link aggregation (can also be referred to as a multi-chassis trunk) can be established across a plurality of switches for one or more end devices or switches. In a multi-chassis link aggregation, at least one link couples a respective switch associated with the link aggregation. The switches associated with the link aggregation elect one of the switches as a master switch while the others remain slave switches. Among these switches, only the master switch establishes a connection with the controller and receives the flow definitions, which comprises the logical identifiers as input and/or output ports. A respective slave switch receives the flow definitions from the master switch. As a result, the flow definitions are replicated in the master switch as well as the slave switches, without the slave switches establishing a connection with the controller. Because all switches associated with the multi-chassis link aggregation have the same flow definitions, whenever the master switch fails, one of the slave switches can readily take over as the master switch.

In this disclosure, the term "software-defined network" refers to a network that facilitates control over a respective data flow by specifying the action associated with the flow in a flow definition. A controller, which can be a server, coupled to the software-defined network provides a respective switch in the software-defined network with the flow definitions. A flow definition can include a priority value, a rule that specifies a flow, and an action (e.g., a forwarding port or "drop") for the flow. The rule of a flow definition can specify, for example, any value combination in the ten-tuple of {in-port, virtual local area network (VLAN) identifier, media access control (MAC) source and destination addresses, Ethertype, Internet protocol (IP) source and destination addresses, IP Protocol, Transmission Control Protocol (TCP) source and destination ports}. Other packet header fields can also be included in the flow rule. Depending on its specificity, a flow rule can correspond to one or more flows in the network. Upon matching a respective packet to a rule, the switch in the software-defined network takes the action included in the corresponding flow definition. An example of a software-defined network includes, but is not limited to, OpenFlow, as described in Open Networking Foundation (ONF) specification "OpenFlow Switch Specification," available at http://www.openflow.org/documents/openflow-spec-v1.1.0.pdf, which is incorporated by reference herein.

In this disclosure, a switch in a software-defined network and capable of processing software-defined flows is referred to as a "software-definable" switch. Such a software-definable switch can include both ports that process software-defined flows and ports reserved for convention packet forwarding (e.g., layer-2/Ethernet switching, or IP routing), which are referred to as "regular ports" in this disclosure. A flow definition typically includes one or more software-definable in-ports to which the definition is applicable. Any flow arriving via any port can potentially be a match for the generic flow definition.

In some embodiments, the software-defined network is a fabric switch and a respective switch in the software-defined network is a member switch of the fabric switch. The fabric switch can be an Ethernet fabric switch. In an Ethernet fabric switch, any number of switches coupled in an arbitrary topology may logically operate as a single switch. Any new switch may join or leave the fabric switch in "plug-and-play" mode without any manual configuration. A fabric switch appears as a single logical switch to the end device.

Although the present disclosure is presented using examples based on OpenFlow, embodiments of the present invention are not limited to networks defined OpenFlow or a particular Open System Interconnection Reference Model (OSI reference model) layer. In this disclosure, the term "software-defined network" is used in a generic sense, and can refer to any network which facilitates switching of data flows based on software-defined rules. The term "flow definition" is also used in a generic sense, and can refer to any rule which identifies a data frame belonging to a specific flow and/or dictates how a switch should process the frame.

The term "end device" can refer a host, a conventional layer-2 switch, or any other type of network device. Additionally, an end device can be coupled to other switches or hosts further away from a network. An end device can also be an aggregation point for a number of network devices to enter the network.

The term "message" refers to a group of bits that can be transported together across a network. "Message" should not be interpreted as limiting embodiments of the present invention to any specific networking layer. "Message" can be replaced by other terminologies referring to a group of bits, such as "frame," "packet," "cell," or "datagram." The term "frame" is used in a generic sense and should not be interpreted as limiting embodiments of the present invention to layer-2 networks. "Frame" can be replaced by other terminologies referring to a group of bits, such as "packet," "cell," or "datagram."

The term "switch" is used in a generic sense, and it can refer to any standalone or fabric switch operating in any network layer. "Switch" should not be interpreted as limiting embodiments of the present invention to layer-2 networks. Any device that can forward traffic to an end device can be referred to as a "switch." Examples of a "switch" include, but are not limited to, a layer-2 switch, a layer-3 router, a Transparent Interconnection of Lots of Links (TRILL) Routing Bridge (RBridge), an FC router, or an FC switch.

The term "Ethernet fabric switch" refers to a number of interconnected physical switches which form a single, scalable logical switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally.

Network Architecture

FIG. 1A illustrates an exemplary link aggregation in a heterogeneous software-defined network, in accordance with an embodiment of the present invention. A heterogeneous software-defined network 100 includes regular switches 102 and 103. Also included is software-definable switch 101, which is capable of processing software-defined flows. Controller 130 is logically coupled to switch 101 in network 100. The logical connection between controller 130 and switch 101 can include one or more physical links. Switches 102 and 103 are coupled to switch 101 via link aggregation 110 and a physical link, respectively.

During operation, switch 101 allocates logical identifier 122 to port group 142 comprising physical ports 112 and 114 in link aggregation 110, and logical identifier 124 to port group 144 comprising physical port 116. Switch 101 also maintains a mapping between logical identifier 122 and ports 112 and 114 in corresponding port group 142, and logical identifier 124 and port 116 in corresponding port group 144. For configuring flow definitions, controller 130 sends a query to switch 101 for the port identifiers of switch 101. Controller 130 can send the query based on a preconfigured instruction (e.g., a daemon running on controller 130) or an instruction from a network administrator (e.g., instruction received via an input device).

Upon receiving the query, switch 101 provides logical identifiers 122 and 124 to controller 130. With the existing technologies, switch 101 sends identifiers of ports 112, 114, and 116. Consequently, controller 130 cannot generate flow definition for link aggregation 110. However, when controller 130 receives logical identifier 122, controller 130 perceives that switch 102 is coupled to switch 101 via a single port. As result, controller 130 provides flow definitions comprising logical identifier 122 as an input and/or output port. Similarly, controller 130 also provides flow definitions comprising logical identifier 124 as an input and/or output port. Upon receiving the flow definitions, switch 101 converts the flow definitions from logical identifiers 122 and 124 based on the mapping and makes the flow definitions applicable to the ports in corresponding port groups 142 and 144, respectively. In some embodiments, switch 101 further incorporates any local policy regarding the traffic distribution across ports 112 and 114 in addition the flow definitions comprising logical identifier 122. Switch 101 then uses a data structure (e.g., a linked-list) to store the flow definitions based on ports 112, 114, and 116. Switch 101 also incorporates the flow definitions in lookup information in hardware (e.g., in a CAM).

In the example in FIG. 1A, to allow switch 102 to forward a data flow to switch 103, controller 130 provides switch 101 a corresponding flow definition. The flow definition specifies logical identifier 122 as an input port and logical identifier 124 as an output port. The flow definition also includes a rule which represents the data flow from switch 102 to switch 103. Upon receiving the flow definition, switch 101 converts the logical identifier 122 to port 112 (or, depending on the forwarding policy, to port 114) and logical identifier 124 to port 116 in the flow definition. In this way, switch 101 converts the flow definition comprising logical identifiers 122 and 124, and makes the flow definition applicable to ports 112 and 116. Switch 101 stores the converted flow definition in the local lookup information. When switch 101 receives a data frame via port 112, switch 101 matches the data frame with the lookup information and identifies port 116 to be the output port. Switch 101 then transmits the data frame to port 116.

Figure 1B:
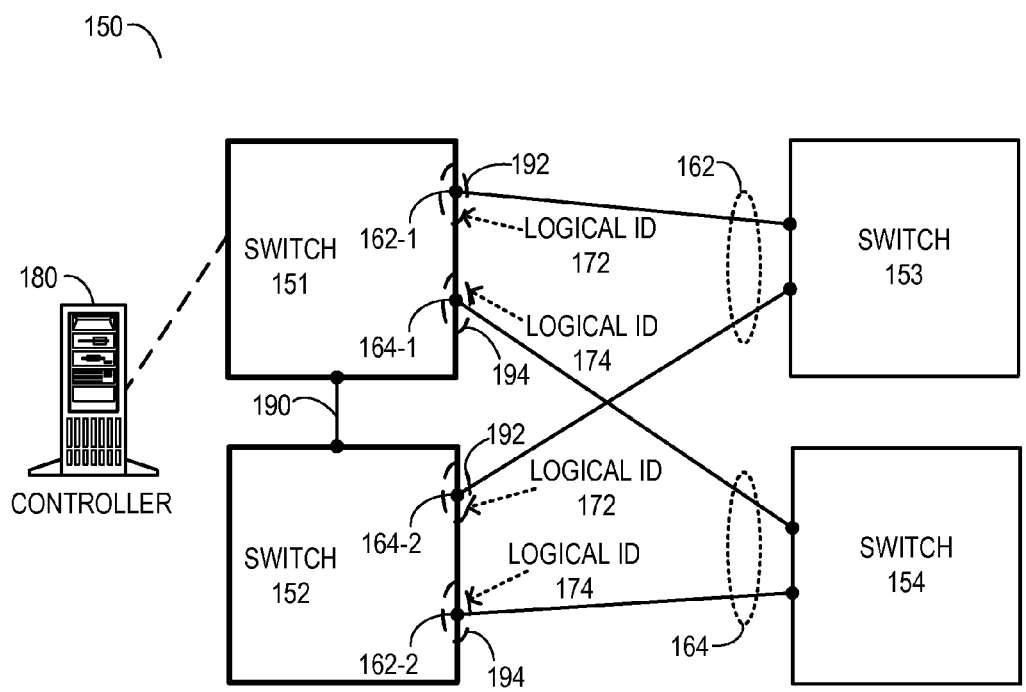
FIG. 1B illustrates exemplary fault-resilient multi-chassis link aggregations in a heterogeneous software-defined network, in accordance with an embodiment of the present invention.

FIG. 1B illustrates exemplary fault-resilient multi-chassis link aggregations in a heterogeneous software-defined network, in accordance with an embodiment of the present invention. A heterogeneous software-defined network 150 includes regular switches 153 and 154. Also included are software-definable switches 151 and 152. Switches 153 and 154 are coupled to switches 151 and 152 via link aggregations 192 and 194, respectively. During operation, switches 151 and 152 negotiate among each other via inter-switch link 190 and elect switch 151 as a master switch for link aggregations 192 and 194. In some embodiments, a respective link aggregation can have a respective master switch. Switch 152 operates as a slave switch in conjunction with master switch 151.

Switch 151 allocates logical identifier 172 and 174 to port groups 192 and 194, respectively. Port groups 192 and 194 include ports 162-1 and 164-1, respectively, which are associated with link aggregations 192 and 194, respectively. Switch 151 creates a mapping between logical identifier 172 and corresponding port 162-1 in port group 192, and logical identifier 174 and corresponding port 164-1 in port group 194. In some embodiments, switch 151 shares the mapping with switch 152 via link 190. Upon receiving the mapping, switch 152 identifies ports 164-2 and 162-2 as parts of in port groups 192 and 194, respectively. Switch 152 allocates logical identifier 172 and 174 to ports 164-2 in port group 192 and 162-2 in port group 194, respectively, and creates a local mapping between logical identifier 172 and port 164-2 in corresponding port group 192, and logical identifier 174 and port 162-2 in corresponding port group 194. Because a logical identifier can represent a respective port of a multi-chassis link aggregation, the link aggregation can have different physical ports (i.e., ports with different identifiers) on different switches. For example, link aggregation 192 includes port 162-1 in switch 151 and port 164-2 in switch 152.

For configuring flow definitions, controller 180 sends a query to switch 151 for the port identifiers of switch 151. Upon receiving the query, switch 151 provides logical identifiers 172 and 174 to controller 180. Controller 180 then creates flow definitions for logical identifiers 172 and 174, which can be based on an instruction from a network administrator, and sends the flow definitions to switch 151. Switch 151 sends the flow definitions to switch 152 via link 190 and locally converts the flow definitions based on the local mapping and makes the flow definitions applicable to ports 162-1 and 164-1. Upon receiving the flow definitions from switch 151, switch 152 locally converts the flow definitions based on the local mapping and makes the flow definitions applicable to ports 164-2 and 162-2. As a result, the same flow definitions are replicated in switches 151 and 152, without switch 152 establishing a connection to controller 180. In this way, switches 151 and 152 provide link and node-level high availability to switch 153 and 154 without any modification to controller 180.

The forwarding policy of switches 151 and 152 determines which of switches 151 and 152 forwards traffic. If an active-active forwarding policy is adopted, both switches 151 and 152 forward traffic matched by the flow definitions. If an active-standby forwarding policy is adopted, switch 151 forwards the traffic matched by the flow definitions while switch 152 drops the traffic. Even when switch 152 remains standby, because both switches 151 and 152 have the flow definitions, slave switch 152 can readily take over as the master switch whenever switch 151 fails.

Figure 2A:
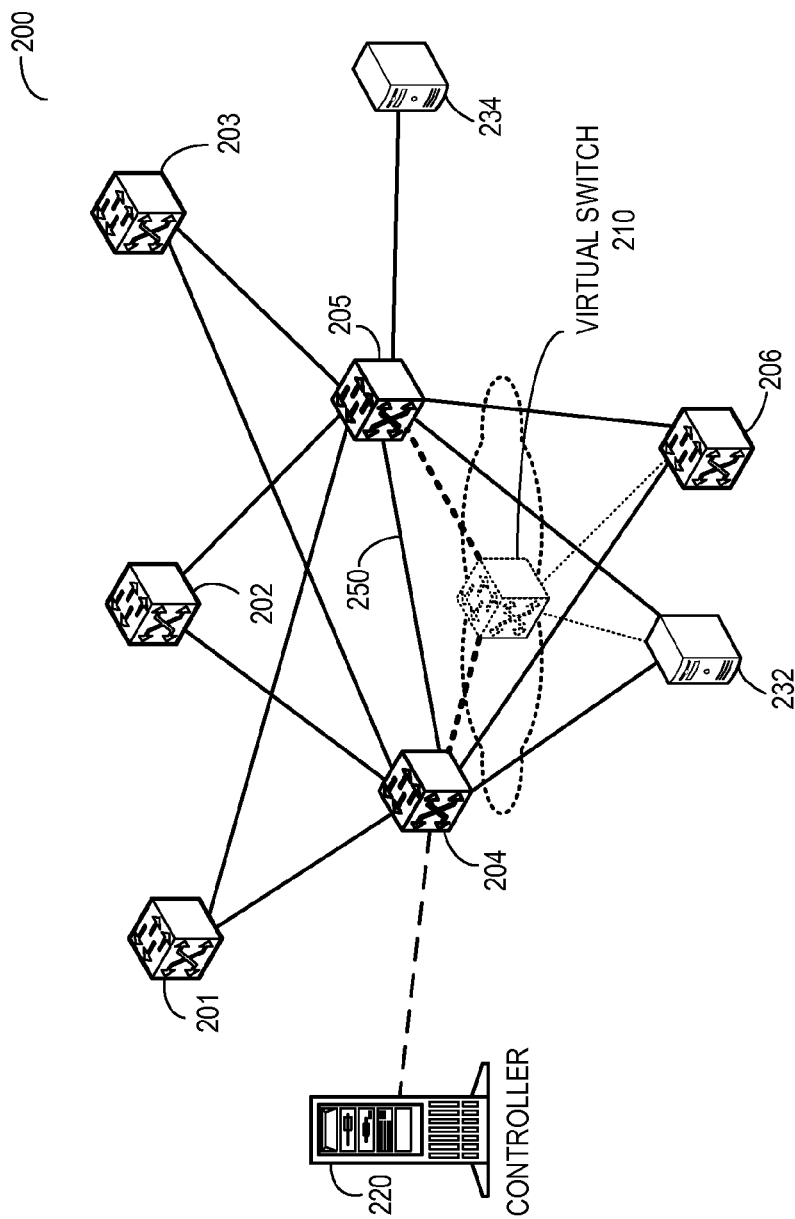
FIG. 2A illustrates an exemplary heterogeneous software-defined network with multi-chassis link aggregation, in accordance with an embodiment of the present invention.

FIG. 2A illustrates an exemplary software-defined network with a virtual-switch-based multi-chassis link aggregation, in accordance with an embodiment of the present invention. A heterogeneous software-defined network 200 includes regular switches 201, 202, and 203. Also included are software-definable switches 204 and 205, which are capable of processing software-defined flows. End device 232 and switch 206 both are dual-homed and coupled to switches 204 and 205. The goal is to allow a dual-homed device to use both physical links to multiple software-definable switches as a multi-chassis link aggregation, with the same address. Examples of such address include, but are not limited to a MAC address, an IP address, or an RBridge identifier.

In embodiments of the present invention, as illustrated in FIG. 2, switches 204 and 205 are configured to operate in a special "trunked" mode for end device 232 and switch 206. End device 232 and switch 206 view switches 204 and 205 as a common virtual switch 210, with a corresponding virtual address. End device 232 and switch 206 are considered to be logically coupled to virtual switch 210 via logical links represented by dotted lines. Virtual switch 210 is considered to be logically coupled to both switches 204 and 205, optionally with zero-cost links (also represented by dotted lines). While forwarding data frames from end device 232 and switch 206, switches 204 and 205 mark the data frames with virtual switch 210's address as their source address. As a result, other switches in network 200 can learn that end device 232 and switch 206 are both reachable via virtual switch 210.

In the following description, switches which participate in link aggregation are referred to as "partner switches." Since the two partner switches function as a single logical switch, the MAC address reachability learned by a respective switch is shared with the other partner switch. For example, during normal operation, end device 232 may choose to send its outgoing data frames only via the link to switch 205. As a result, only switch 205 would learn end device 232's MAC address. This information is then shared by switch 205 with switch 204 via inter switch link 250. In some embodiments, switches 204 and 205 are TRILL RBridges and virtual switch 210 is a virtual RBridge associated with a virtual RBridge identifier. Under such a scenario, RBridges 204 and 205 can advertise their respective connectivity (optionally via zero-cost links) to virtual RBridge 210. Hence, multi-pathing can be achieved when other RBridges choose to send data frames to virtual RBridge 108 (which is marked as the egress RBridge in the frames) via RBridges 204 and 205.

During operation, switches 204 and 205 negotiate among each other and elect switch 204 as a master switch. Switch 205 operates as a slave switch in conjunction with master switch 204. Switches 204 and 205 uses inter-chassis link 250 between them for sharing information. Switches 204 and 205 allocate logical identifiers to the port groups associated with link aggregations and create local mappings between the logical identifiers and the ports in the corresponding port groups, as described in conjunction with FIGS. 1A and 1B. Between switches 204 and 205, only master switch 204 establishes a logical connection with controller 220 and receives flow definitions based on the logical identifiers. Switch 204 sends the flow definitions to switch 205. As a result, the flow definitions are replicated in switches 204 and 205, without any modification to controller 220.

To send data frames to end device 232 or switch 206, switches 201, 202, and 203 send data frames toward virtual switch 210. Switches 204 and 205 receive the data frames, recognize the data frames to be forwarded to 210, and compare the data frames with the flow definitions in the lookup information. Depending on the forwarding policy, as described in conjunction with FIG. 1B, either switch 204 or both switches 204 and 205 forward the data frames to end device 232 or switch 206.

The ports capable of receiving software-defined flows (can be referred to as software-definable ports) should have identical configuration in both switches 204 and 205. For example, if master switch 204 has 10 port groups for sending and receiving software-defined flows, slave switch 205 should also have 10 port groups with identical logical identifiers and connectivity associated with the software-definable ports in the port groups. Because switch 204 is coupled to switch 201, 202, and 203 via software-definable ports, switch 205 is also coupled to switch 201, 202, and 203 with identical corresponding logical identifiers. However, rest of the ports can be different. In some embodiments, switches 204 and 205 can have different hardware or software configurations. For example, switch 205 is coupled to end device 234 via a non-software-definable port while switch 204 is not.

Figure 2B:
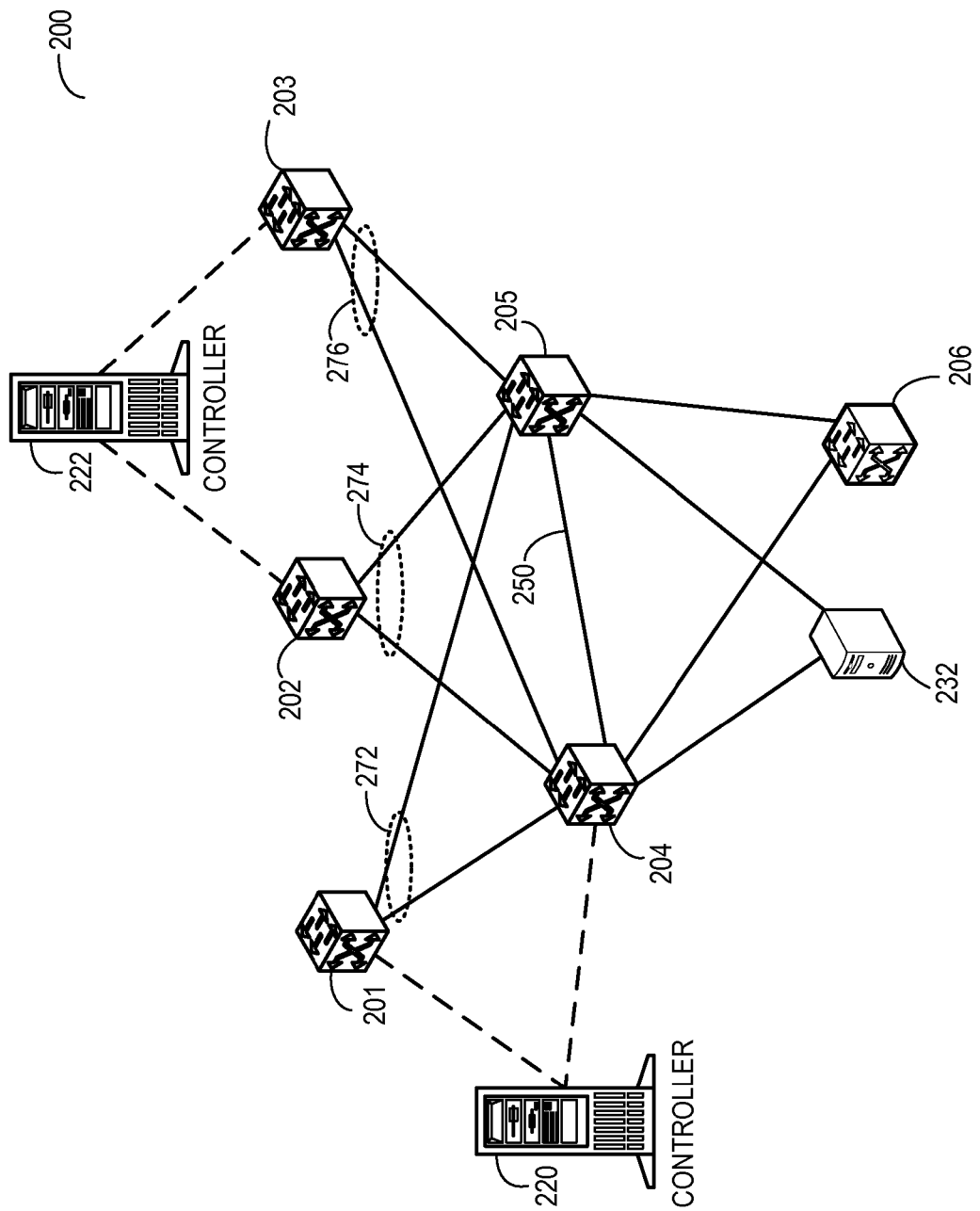
FIG. 2B illustrates an exemplary heterogeneous software-defined network with multi-chassis link aggregations between software-definable switches, in accordance with an embodiment of the present invention.

In some embodiments, software-definable switches 204 and 205 can be coupled to other software-definable switches. FIG. 2B illustrates an exemplary heterogeneous software-defined network with multi-chassis link aggregations between software-definable switches, in accordance with an embodiment of the present invention. In the example in FIG. 2B, switches 201, 202, and 203 are software-definable switches as well. Switch 201 receives flow definitions from controller 220, and switches 202 and 203 receive flow definitions from another controller 222. Because flow definitions are specific to a switch and its logical identifiers, even though switches 202 and 203, and switches 204 and 205 have different controllers, these switches can still participate in a link aggregation. To ensure uninterrupted communication with switches 204 and 205, switches 201, 202, and 203 are coupled to switches 204 and 205 via multi-chassis link aggregations 272, 274, and 276, respectively.

Because a respective port in a link aggregation is associated with a logical identifier, a switch can apply a flow definition associated with the logical identifier to all ports in the link aggregation, as described in conjunction with FIG. 1A. For example, switch 201 applies a flow definition associated with the logical identifier of the port group associated with link aggregation 272 to all ports in the port group. Consequently, if switch 204 becomes unavailable due to a link or node failure, switches 201 can still forward the data frames belonging to a software-defined flow to switch 205 via the active links in link aggregation 272. Similarly, switches 202 and 203 can still forward to switch 204 via the active links in link aggregations 274 and 276, respectively. Note that link aggregations 272, 274, and 276 are distinguishable from the perspectives of switches 201, 202, and 203, and switches 204 and 205. For example, from switch 201's perspective, link aggregation 272 provides link level high-availability and ensures frame forwarding via at least one port when another port cannot forward data frames. On the other hand, from switch 204's perspective, link aggregation 272 provides both link and node level high-availability. Even when switch 204 fails, switch 205 is available for forwarding data frames to switch 201.

Initialization

Figure 3A:
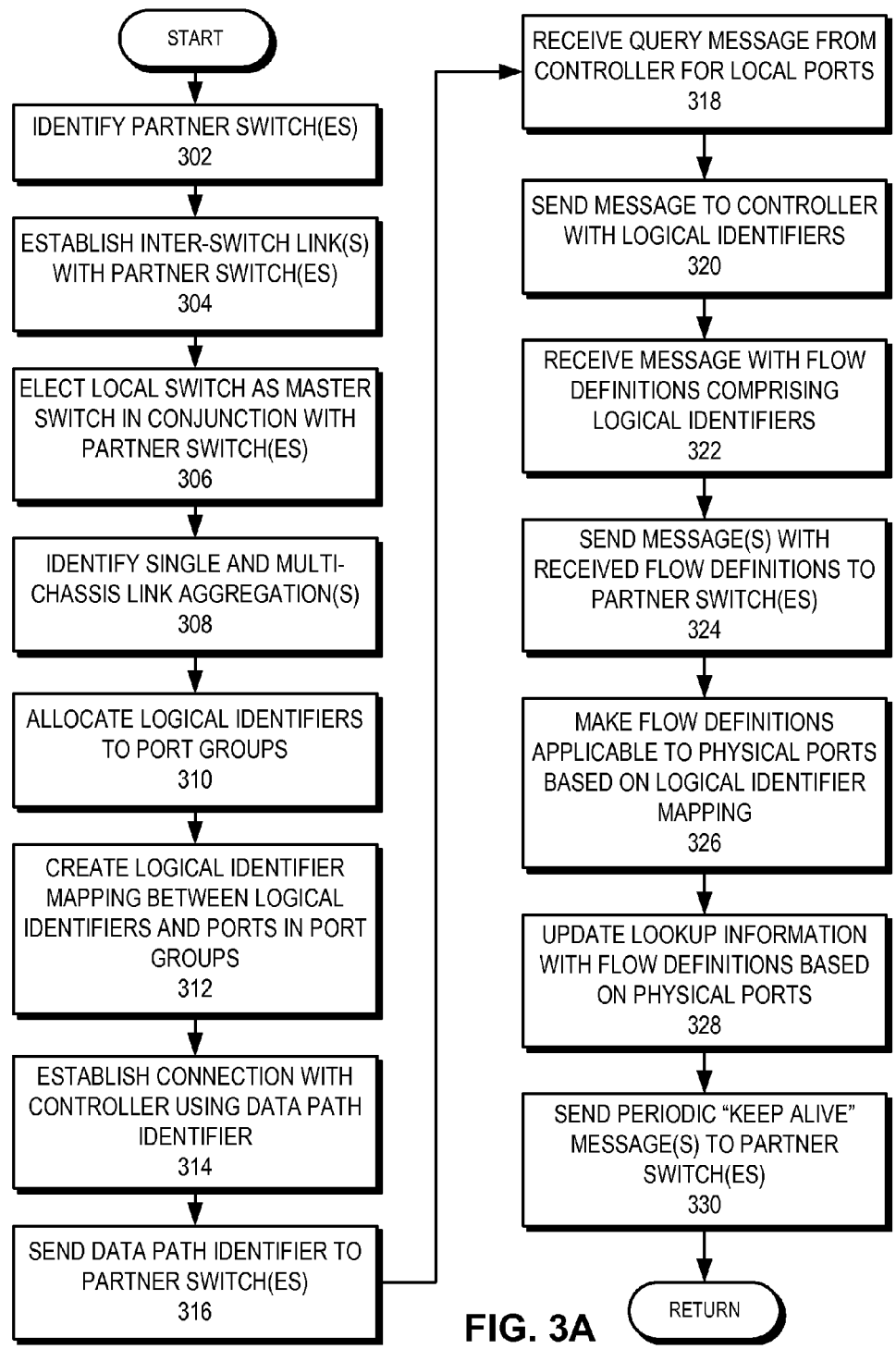
FIG. 3A presents a flowchart illustrating the initialization process of a master software-definable switch of a multi-chassis link aggregation, in accordance with an embodiment of the present invention.

In the example in FIG. 1B, switches 151 and 152 initialize their respective operations to operate as a master and slave switch, respectively. FIG. 3A presents a flowchart illustrating the initialization process of a master software-definable switch of a multi-chassis link aggregation, in accordance with an embodiment of the present invention. The switch first identifies partner switch(es) (operation 302) and establishes inter-switch link(s) with the partner switch(es) (operation 304). The switch elects the local switch as the master switch in conjunction with the partner switch(es) (operation 306). The switch identifies the single- and multi-chassis link aggregations associated with the switch (operation 308) and allocates logical identifiers to port groups (operation 310). The switch can execute operations 302, 304, 306, 308, and 310 based on a preconfigured instruction (e.g., a daemon running on the switch) or an instruction from a network administrator (e.g., instruction received via an interface).

The switch allocates only one logical identifier to a port group associated with a link aggregation, thereby associating the plurality of ports of the port group with the logical identifier. The switch also allocates a logical identifier to a respective port group comprising an individual port not in a link aggregation. The switch creates a logical identifier mapping between the logical identifiers and the ports in their corresponding port groups (operation 312). The switch establishes a connection with the controller using a data path identifier (operation 314). The data path identifier identifies the switch to the controller. The switch shares its data path identifier with other partner switch(es) (operation 316). In some embodiments, the data path identifier is preconfigured in a respective partner switch.

The switch receives a query message from the controller for local port information (operation 318). In response, the switch sends one or more messages with the logical identifiers as port identifiers to the controller (operation 320). Because a link aggregation is associated with a single logical identifier, the controller considers the ports in the link aggregation to be a single port. The controller provides flow definitions comprising the logical identifiers as input and output ports. The switch receives one or more messages with the flow definitions (operation 322) and sends the received flow definitions to partner switch(es) (operation 324) via one or more messages.

The switch then converts the flow definition based on the mapping and makes the definitions applicable to the physical ports in the port groups corresponding to the logical identifiers (operation 326). The switch then updates the lookup information with converted flow definitions based on the physical ports in software (e.g., a linked list representing the flow definitions) and hardware (e.g., a CAM) (operation 328). In some embodiments, the switch further incorporates any local policy regarding the traffic distribution across the ports in the link aggregation in addition to the flow definition. The switch then send periodic "keep alive" message to the partner switch(es) to notify them that the master switch is operational (operation 330).

Figure 3B:
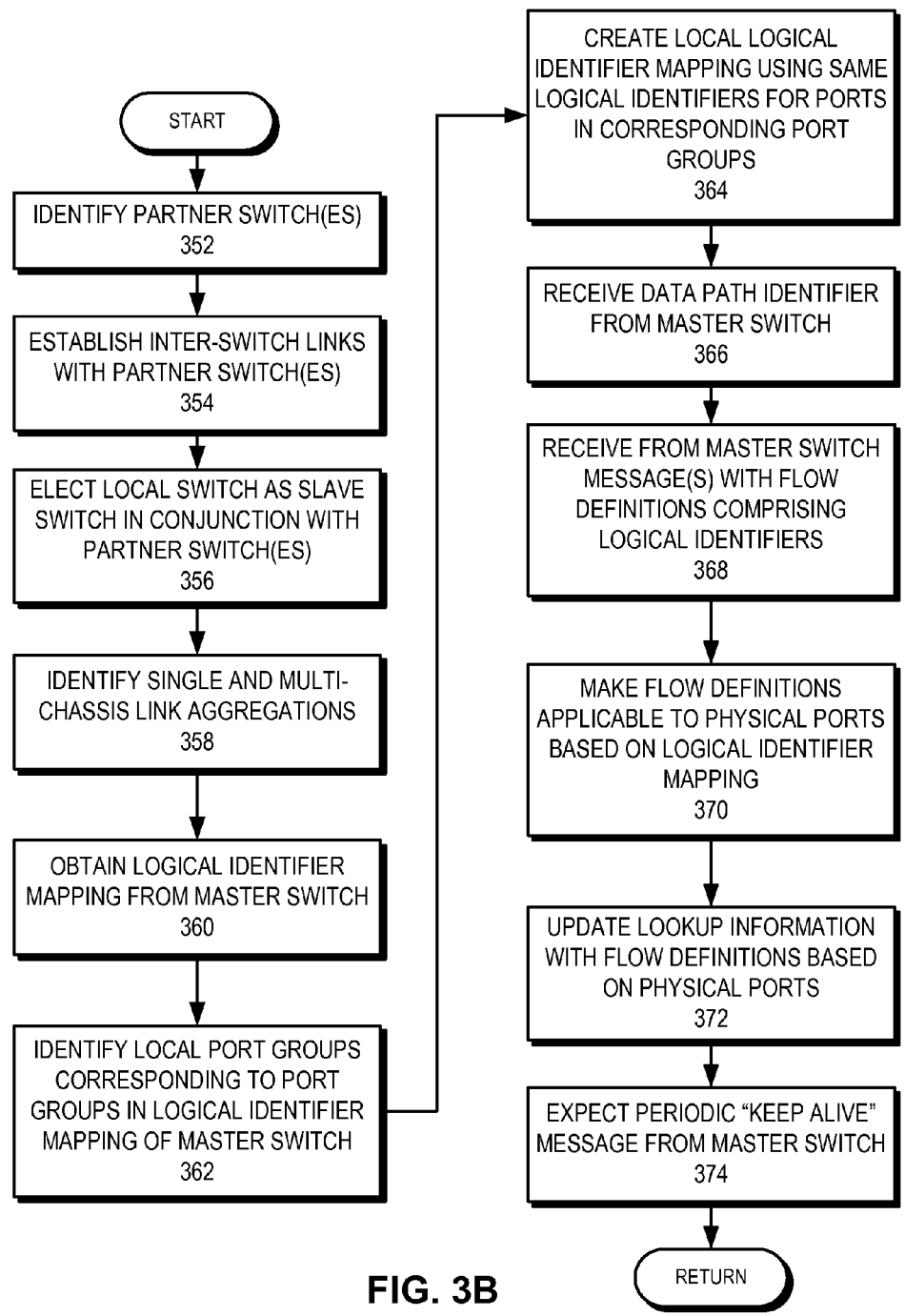
FIG. 3B presents a flowchart illustrating the initialization process of a salve software-definable switch of a multi-chassis link aggregation, in accordance with an embodiment of the present invention.

FIG. 3B presents a flowchart illustrating the initialization process of a salve software-definable switch of a multi-chassis link aggregation, in accordance with an embodiment of the present invention. The switch first identifies partner switch(es) (operation 352) and establishes inter-switch link(s) with the partner switch(es) (operation 354). The switch elects the local switch as a slave switch in conjunction with the partner switch(es) (operation 356). In some embodiments, a respective link aggregation can have a respective master switch. The switch identifies the single- and multi-chassis link aggregations associated with the switch (operation 358). The switch can execute operations 352, 354, 356, and 358 based on a preconfigured instruction or an instruction from a network administrator. The switch receives a logical identifier mapping from the master switch via an inter-switch link (operation 360) and identifies the local port groups (individual and in link aggregations) corresponding to port groups in the logical identifier mapping of the master switch (operation 362).

The switch creates a local logical identifier mapping using the same logical identifiers in the logical identifier mapping of the master switch for the ports in the corresponding port groups (operation 364). For example, if the master switch has 10 port groups, the switch should also have 10 port groups with identical logical identifiers and connectivity associated with the software-definable ports in the port groups. The switch then receives from the master switch the data path identifier which the master switch has used to establish connection with the controller (operation 366). The switch stores the data path identifier and uses the identifier to establish connection with the controller if the master switch fails.

The switch receives from the master switch one or more messages with the flow definitions comprising the logical identifiers in the logical identifier mapping (operation 368). The switch converts the flow definition based on the local logical identifier mapping and makes the definitions applicable to the physical ports in the port groups corresponding to the logical identifiers (operation 370). The switch then updates the lookup information with converted flow definitions based on the physical ports in software (e.g., a linked list representing the flow definitions) and hardware (e.g., a CAM) (operation 372). In some embodiments, the switch further incorporates any local policy regarding the traffic distribution across the ports in the link aggregation in addition to the flow definition. Afterward, the switch continues to expect periodic "keep alive" message from the master switch to be notified about the operational state of the master switch (operation 374).

Operations

In the example in FIG. 1B, switch 151 has an active communication with controller 180 and receives flow definitions from controller 180. Switch 152 receives these flow definitions from switch 151. To ensure that the flow definitions are always replicated at switch 152, whenever switch 151 receives a new or updated (e.g., modified or deleted) flow definition from controller 180, switch 151 sends the flow definition to switch 152. Upon receiving the flow definition from switch 151, switch 152 updates the flow definitions in local lookup information.

Figure 4A:
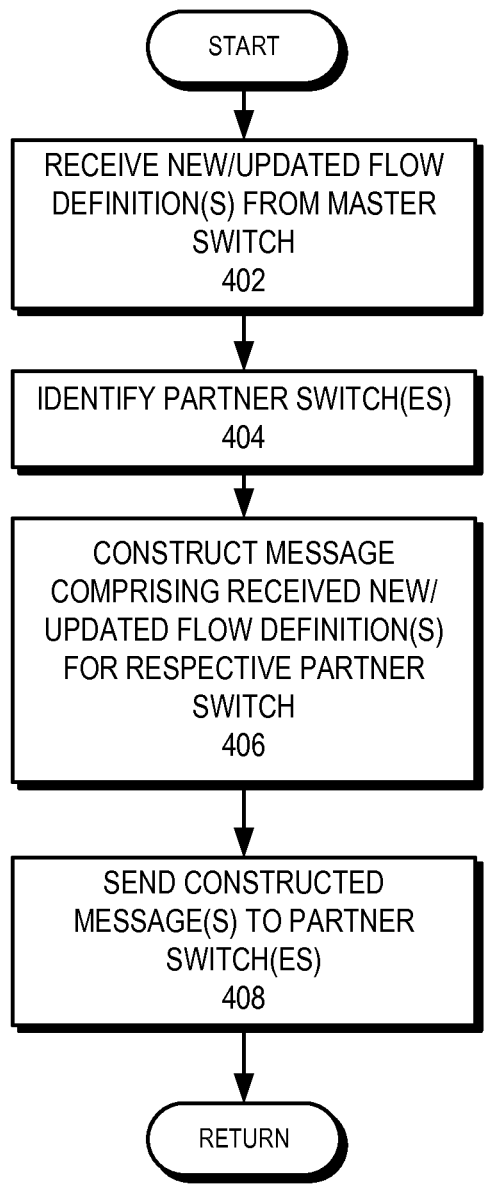
FIG. 4A presents a flowchart illustrating the process of a master software-definable switch of a multi-chassis link aggregation sharing new/updated flow definitions with a respective salve software-definable switch of the link aggregation, in accordance with an embodiment of the present invention.

FIG. 4A presents a flowchart illustrating the process of a master software-definable switch of a multi-chassis link aggregation sharing new/updated flow definitions with a respective salve software-definable switch of the link aggregation, in accordance with an embodiment of the present invention. Upon receiving new or updated flow definition(s) from the controller (operation 502), the switch identifies the partner switches (operation 504). The switch constructs one or more messages for a respective partner switch comprising the new or updated flow definition(s) (operation 506) and sends the message(s) to the partner switch(es) (operation 508). If the switch receives multiple flow definitions from the controller, the switch can include all flow definitions in a single message or send individual messages for a respective received flow definition. Any message from the master switch can be a layer-2 frame, a layer-3 packet, a TRILL packet, a Fibre Channel frame, or have any other messaging format. The switch can also encapsulate the message based on a security scheme implemented in partner switches.

Figure 4B:
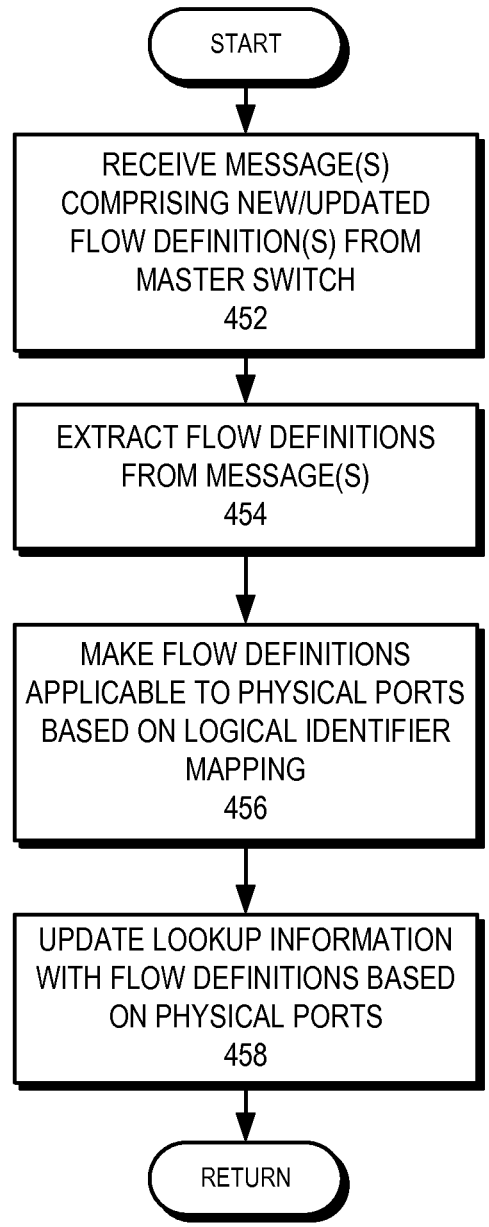
FIG. 4B presents a flowchart illustrating the process of a slave software-definable switch of a multi-chassis link aggregation updating lookup information with received flow definitions from the master switch of the link aggregation, in accordance with an embodiment of the present invention.

FIG. 4B presents a flowchart illustrating the process of a slave software-definable switch of a multi-chassis link aggregation updating lookup information with received flow definitions from the master switch of the link aggregation, in accordance with an embodiment of the present invention. The switch receives from the master switch one or more messages comprising the new or updated flow definitions (operation 452). These flow definitions include the logical identifiers associated with the switch. The switch extracts the flow definitions from the message(s) (operation 454). The extraction process can include decapsulating security encapsulation and one or more of layer-2, layer-3, layer-4, TRILL, and Fibre Channel frame encapsulation. The switch converts the flow definition based on the local logical identifier mapping and makes the definitions applicable to the physical ports corresponding to the logical identifiers (operation 456). The switch then updates the lookup information with converted flow definitions based on the physical ports in software (e.g., a linked list representing the flow definitions) and hardware (e.g., a CAM) (operation 458).

Figure 5:
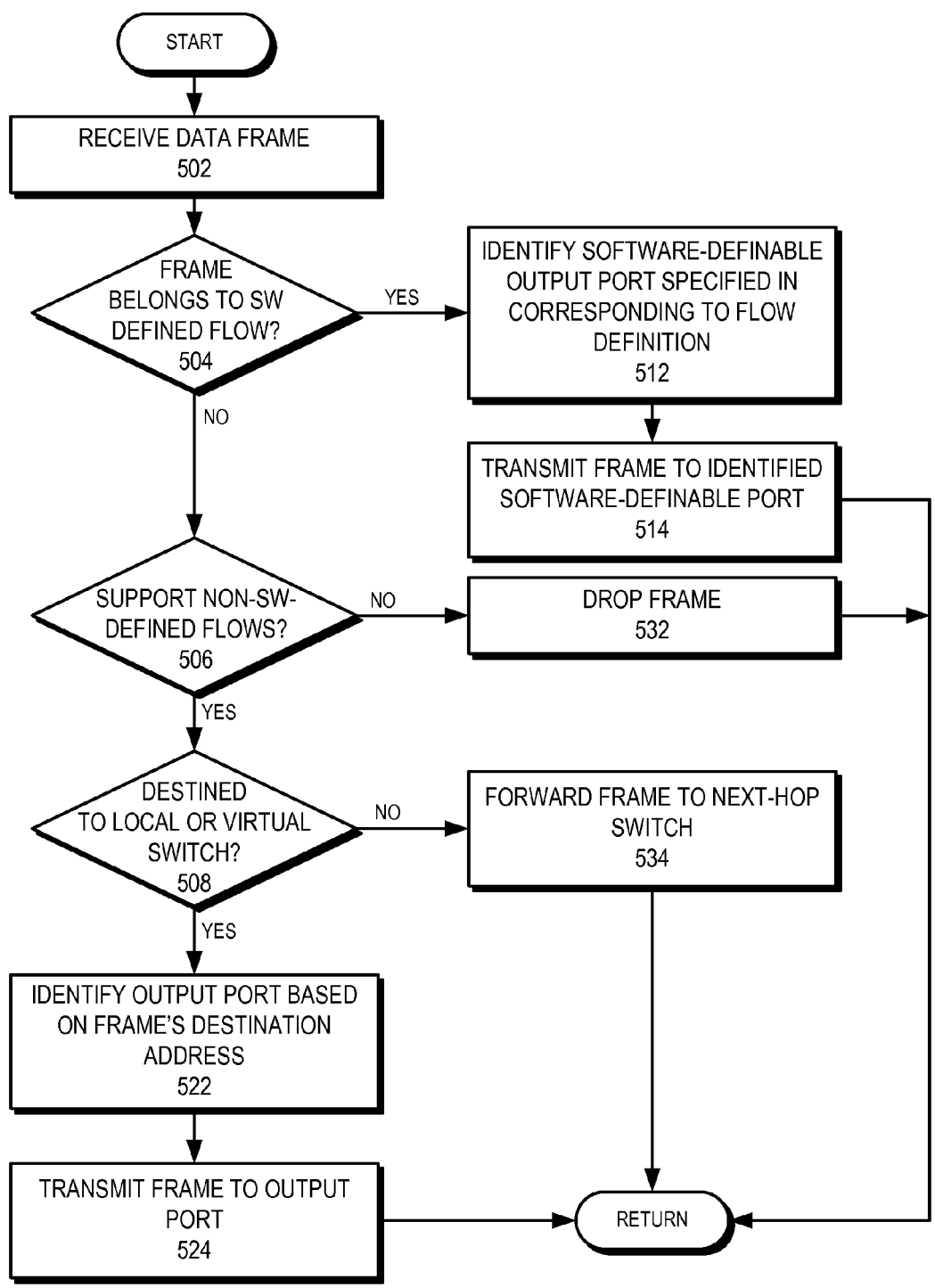
FIG. 5 presents a flowchart illustrating the traffic forwarding process of a software-definable switch in a multi-chassis link aggregation, in accordance with an embodiment of the present invention.

FIG. 5 presents a flowchart illustrating the traffic forwarding process of a software-definable switch in a multi-chassis link aggregation forwarding traffic, in accordance with an embodiment of the present invention. Upon receiving a data frame (operation 502), the switch checks whether the data frame belongs to a software-defined flow (operation 504). The switch checks whether the data frame belongs to a software-defined flow by determining whether the data frame matches at least one of the flow definitions in the local lookup information (e.g., in a CAM). If the data frame belongs to a software-defined flow, the switch identifies the software-definable output port specified in the flow definition corresponding to the software-defined flow (operation 512) and transmits the data frame to the identified software-definable port (operation 514).

If the data frame does not belong to a software-defined flow, the switch checks whether the switch supports non-software-defined flows (operation 506). If the switch does not support non-software-defined flow, the switch drops the data frame (operation 532). If the switch supports non-software-defined flows, the switch checks whether the data frame is destined to the local switch or a virtual switch associated with the switch (operation 508), as described in conjunction with FIG. 2A. If the data frame is not destined to the local switch or a virtual switch, the switch forwards the data frame to next-hop switch (operation 532). If the data frame is destined to the local switch or a virtual switch, the switch identifies an output port for the data frame's destination address (operation 522). For example, if the data frame is a TRILL packet, the switch can identify the output port based on the egress RBridge identifier of the TRILL packet. The switch then forwards the data frame to the output port (operation 524).

Failure Handling

Figure 6A:
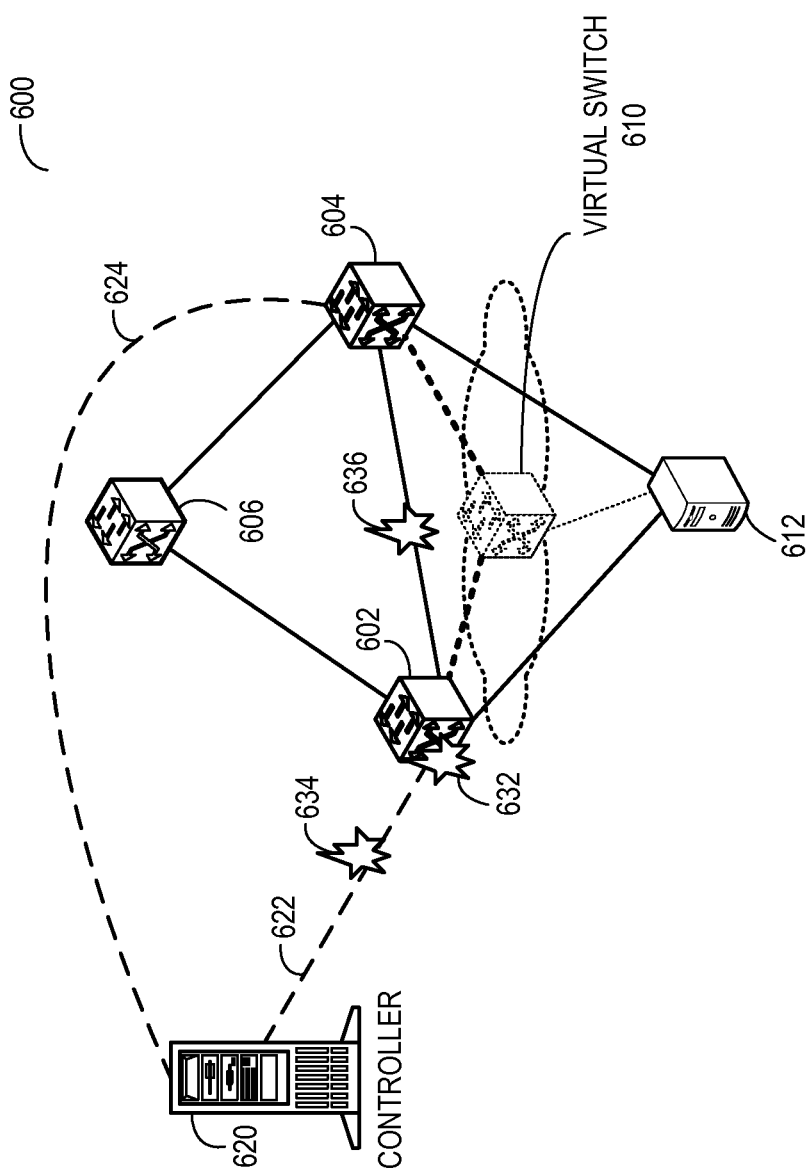
FIG. 6A illustrates exemplary failures associated with a multi-chassis link aggregation in a heterogeneous software-defined network, in accordance with an embodiment of the present invention.

FIG. 6A illustrates exemplary failures associated with a multi-chassis link aggregation in a heterogeneous software-defined network, in accordance with an embodiment of the present invention. A heterogeneous software-defined network 600 includes regular switch 606 and software-definable switches 602 and 604. End device 612 is dual-homed and coupled to switches 602 and 604, which are configured to operate in a special "trunked" mode for end device 612. End device 612 views switches 602 and 604 as a common virtual switch 610, with a corresponding virtual address. End device 612 is considered to be logically coupled to virtual switch 610 via logical links represented by dotted lines. Virtual switch 610 is considered to be logically coupled to both switches 602 and 604, optionally with zero-cost links (also represented by dotted lines).

During operation, switches 602 and 604 negotiate among each other and elect switch 602 as a master switch. Switch 604 operates as a slave switch. Switches 602 and 604 allocate logical identifiers to the ports in link aggregation that couples end device 612. Switch 602 establishes a logical connection 622 with controller 620 using a data path identifier and receives flow definitions based on the logical identifiers. Switch 602 sends the data path identifier and the flow definitions to switch 604 via one or more messages. As a result, the flow definitions are replicated in switches 602 and 604, without switch 604 establishing a connection with controller 620.

Suppose that failure 632 fails switch 602. Switch 606 and end device 612 still consider virtual switch 610 to be operational and continues to forward traffic to switch 604. Because switch 604 has the flow definitions, switch 604 can readily process the data frames belonging to the software-defined flows specified by the flow definitions. Furthermore, upon detecting failure 632, switch 604 establishes a logical connection 624 to controller 620 using the same data path identifier used to establish connection 622. Controller 620 considers connection 624 to be from the same switch (i.e., switch 602). As a result, instead of sending flow definitions, controller 220 simply verifies with switch 604 whether the flow definitions are available. In response, switch 604 notifies controller 220 about the availability of the flow definitions. Controller 620 sends subsequent new or updated flow definitions to switch 604 via connection 624.

Suppose that failure 634 fails logical connection 622. Consequently, switch 602 cannot receive flow definitions from controller 220 any longer. Upon detecting failure 634, switch 602 sends a "take over" message instructing switch 604 to assume the role of the master switch. Switch 604, in response, establishes logical connection 624 and starts operating as the master switch while switch 602 starts operating as a slave switch. Suppose that failure 636 fails the inter-switch link between switches 602 and 604. Switch 602 then cannot send new or updated flow definitions to switch 604 any longer. Upon detecting failure 636, switch 604 establishes a new logical connection 624 using its own data path identifier and starts operating as an independent software-definable switch.

Figure 6B:
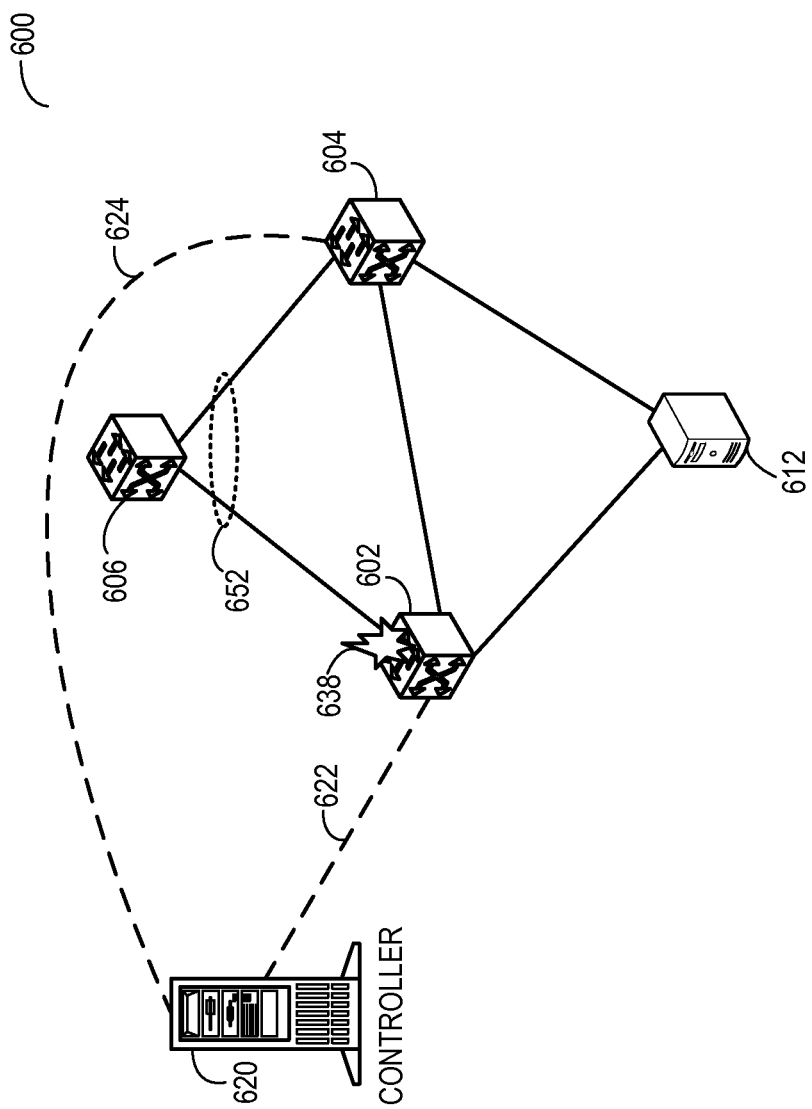
FIG. 6B illustrates an exemplary failure associated with a multi-chassis link aggregation between software-definable switches in a software-defined network, in accordance with an embodiment of the present invention.

FIG. 6B illustrates an exemplary failure associated with a multi-chassis link aggregation between software-definable switches in a software-defined network, in accordance with an embodiment of the present invention. In this example, switch 606 is also a software-definable switch coupled to switches 602 and 604 via multi-chassis link aggregation 652. Suppose that failure 638 fails switch 602. Because switch 606 applies a flow definition associated with the logical identifier of link aggregation 652 to all ports in link aggregation 652, switches 606 can still forward the data frames belonging to a software-defined flow to switch 604 via the active links in link aggregations 602. Consequently, if switch 606 is a software-definable switch, virtual switch 610 is not necessary for switch 606 to forward data frames to end device 612 via switch 604 in the event of failure 638. Note that link aggregation 602 is distinguishable from the perspectives of switch 606, and switches 602 and 604. From switch 606's perspective, link aggregation 652 provides link level high-availability and ensures frame forwarding to switch 604 because another port cannot forward data frames to switch 602. On the other hand, from switch 604's perspective, link aggregation 252 provides both link and node level high-availability. Even when switch 602 fails, switch 604 is available for forwarding data frames to switch 606 and end device 612.

Figure 7A:
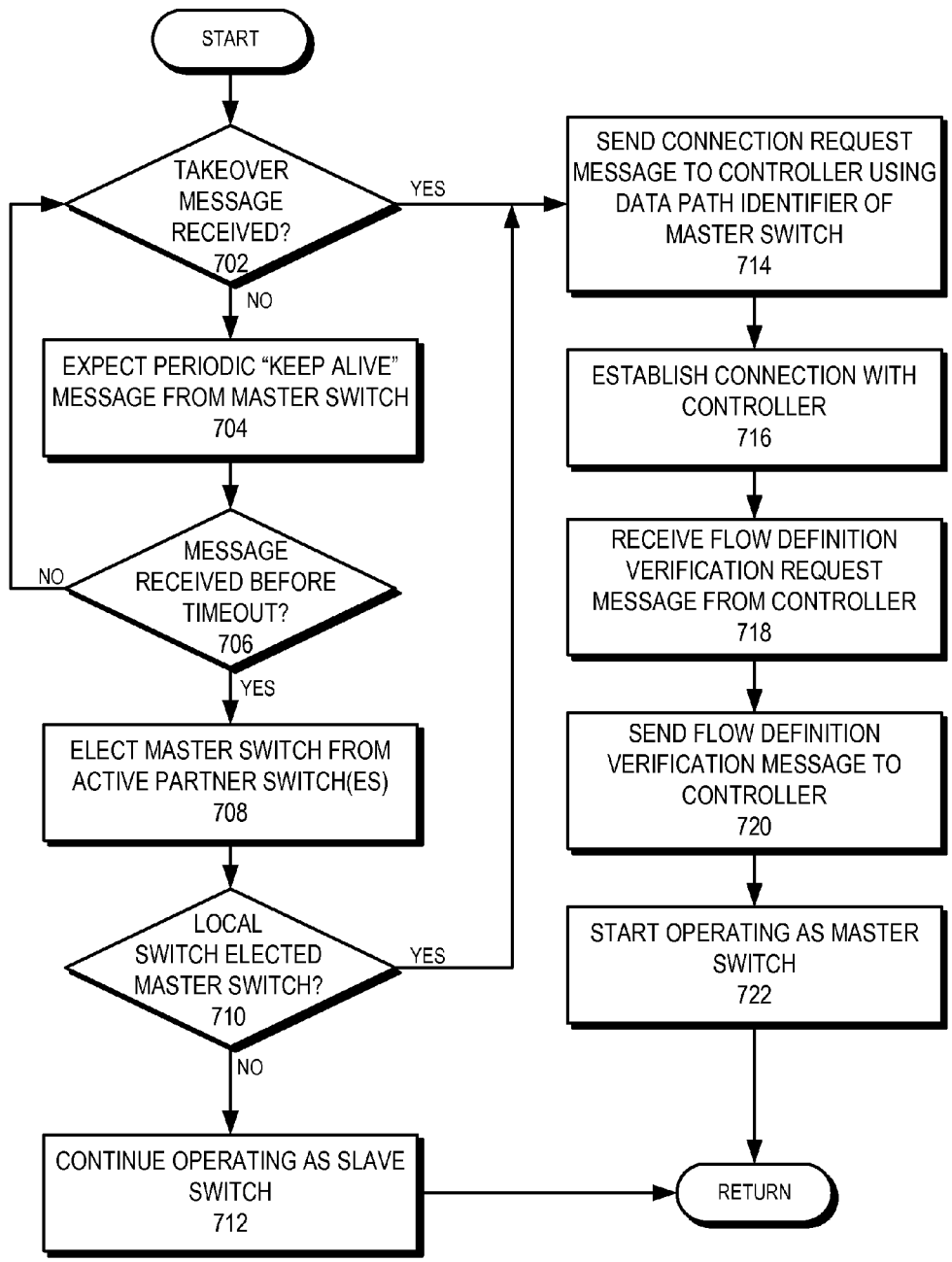
FIG. 7A presents a flowchart illustrating the process of a salve software-definable switch of a multi-chassis link aggregation handling a failure, in accordance with an embodiment of the present invention.

FIG. 7A presents a flowchart illustrating the process of a salve software-definable switch of a multi-chassis link aggregation handling a failure, in accordance with an embodiment of the present invention. The switch first checks whether it has received any "take over" message from the master switch (operation 702). This take over message can be received if the master switch has incurred failure 634, as described in conjunction with FIG. 6A. If not, the switch expects a periodic "keep alive" message from the master switch within a given time period (operation 704). The switch checks whether it has received the message before a timeout period associated with the message (operation 706). If the switch receives the message within the timeout period, the switch continues to check whether it has received any "take over" message from the master switch (operation 702).

If the switch does not receive the "keep alive" message within the timeout period, the switch considers the master switch to be inactive. The master switch being inactive corresponds to failure 632 in FIG. 6A. The switch, in conjunction with other partner switch(es), elects a master switch (operation 708) and checks whether the local switch has been elected as the master switch (operation 710). Note that if the multi-chassis link aggregation is configured with only one slave switch, the switch does not require executing operations 708 and 710. If the switch is not elected as the master switch, the switch continues to operate as the slave switch (operation 712).

If the switch receives a "take over" message from the master switch (operation 702) or has been elected to operate as a master switch (operation 710), the switch sends a connection request to the controller using the data path identifier of the master switch (operation 714) and establishes a logical connection with the controller (operation 716). The switch receives flow definition verification message from the controller (operation 718), as described in conjunction with FIG. 6A. In response, the switch sends a message verifying the flow definitions (operation 720). The switch then starts operating as the master switch for the multi-chassis link aggregation (operation 722).

Figure 7B:
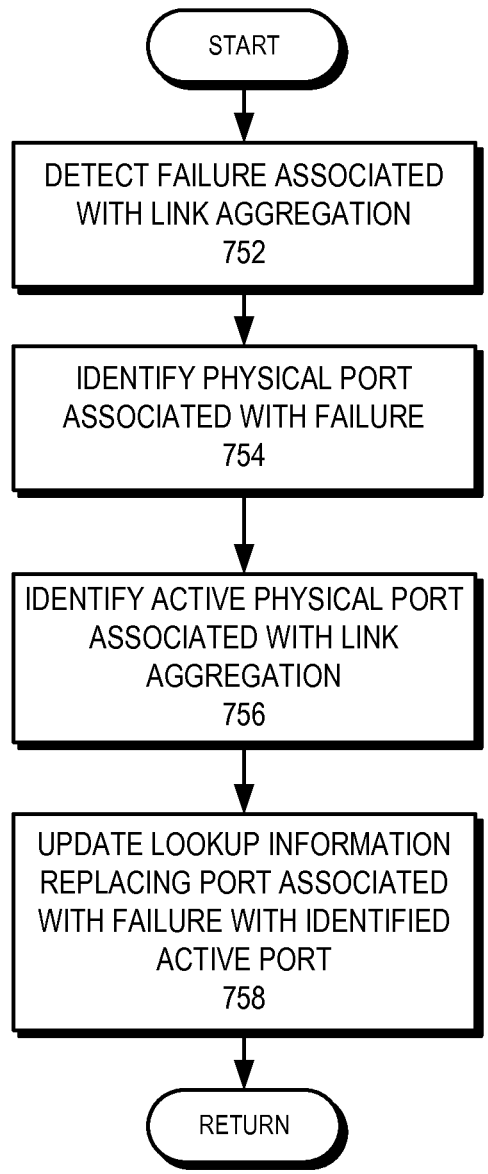
FIG. 7B presents a flowchart illustrating the process of a software-definable switch handling a failure associated with a link aggregation, in accordance with an embodiment of the present invention.

FIG. 7B presents a flowchart illustrating the process of a software-definable switch handling a failure associated with a link aggregation, in accordance with an embodiment of the present invention. In the example in FIG. 6B, this process corresponds to switch 606 handling failure 638. Upon detecting a failure associated with the link aggregation (operation 752), the switch identifies the physical port associated with the failure (operation 754). The switch then identifies the active physical ports associated with the link aggregation (operation 756) and updates the local lookup information replacing the port associated with the failure with the identified active port (operation 758). In the example in FIG. 6B, upon detecting failure 638, switch 606 updates the local lookup information replacing the port coupling switch 602 with the active port in link aggregation 652 coupling switch 604.

Exemplary Switch

Figure 8:
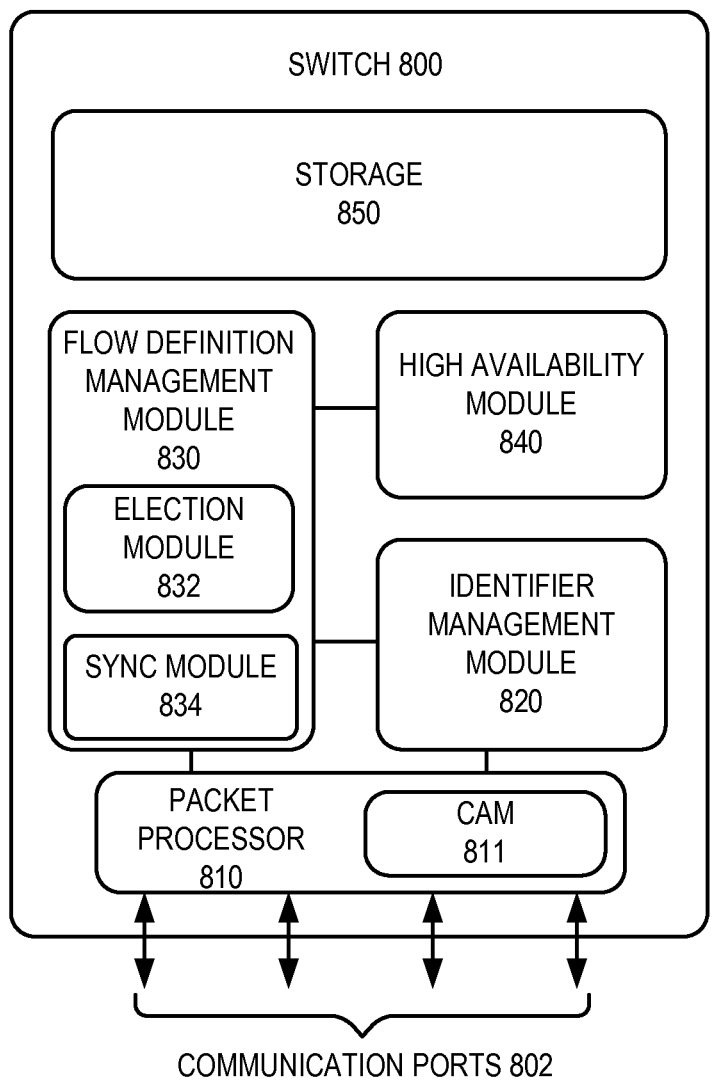
FIG. 8 illustrates an exemplary switch in a software-defined network, in accordance with an embodiment of the present invention.

FIG. 8 illustrates an exemplary switch in a software-defined network, in accordance with an embodiment of the present invention. In this example, a switch 800 includes a number of communication ports 802, a flow definition management module 830, an identifier management module 820, a packet processor 810, and a storage 850. Packet processor 810 further includes a CAM 811, which stores lookup information. One or more of communication ports 802 are software-definable ports. These software-definable ports can be OpenFlow enabled. During operation, identifier management module 820 allocates a logical identifier to a respective port group of one or more software-definable ports. A port group can represent a plurality of software-definable ports associated with a link aggregation. Flow definition management module 830 maintains a mapping between a respective logical identifier and a corresponding port group. In some embodiments, this mapping is stored in storage 850.

Switch 800 provides the logical identifiers as port identifiers of the software-definable ports of the communication ports 802 to a controller in the software-defined network. In response, the controller sends switch 800 a message comprising one or more flow definitions based on the logical identifiers. Flow definition management module 830 operating in conjunction with packet processor 810 receives the message from the controller via one of the communication ports 802. Flow definition management module 830 converts a respective flow definition to make the flow definition applicable to the physical ports in a port group based on the mapping and updates the lookup information with the converted flow definition.

In some embodiments, switch 800 also includes an election module 832, which elects a master switch in conjunction with a remote switch. Switch 800 and the remote switch participate in a multi-chassis link aggregation and have the same logical identifier for the port group associated with the multi-chassis link aggregation. If switch 800 is elected as the master switch, flow definition management module 830 establishes a logical connection with the controller using a data path identifier. Switch 800 also includes a synchronization module 834 which, operating in conjunction with packet processor 810, constructs for the remote switch message(s) including the flow definitions received from the controller. If switch 800 is not elected as the master switch, flow definition management module 830 precludes switch 800 from establishing a logical connection with the controller. Under such a scenario, switch 800 receives message(s) comprising the flow definitions from the remote switch instead of the controller.

In some embodiments, the switch also includes a high-availability module 840. If high-availability module 840 detects that a port in a port group cannot forward traffic (e.g., due to a link failure or a downstream node failure), high-availability module 840 updates the lookup information to make a flow definition associated with the port group applicable to the active ports in the port group. On the other hand, if switch 800 is a not the master switch and if high-availability module 840 detects a failure associated with the remote switch (e.g., a node failure or a failure to the logical link to the controller), flow definition management module 830 establishes a logical connection with the controller using the same data path identifier used by the remote switch. Switch 800 then starts operating as the master switch.

In some embodiments, switch 800 may maintain a membership in a fabric switch. Switch 800 maintains a configuration database in storage 850 that maintains the configuration state of a respective switch within the fabric switch. Switch 800 maintains the state of the fabric switch, which is used to join other switches. Under such a scenario, communication ports 802 can include inter-switch communication channels for communication within a fabric switch. This inter-switch communication channel can be implemented via a regular communication port and based on any open or proprietary format.

Note that the above-mentioned modules can be implemented in hardware as well as in software. In one embodiment, these modules can be embodied in computer-executable instructions stored in a memory which is coupled to one or more processors in switch 800. When executed, these instructions cause the processor(s) to perform the aforementioned functions.

In summary, embodiments of the present invention provide a switch and a method for proving link aggregation in a software-defined network. In one embodiment, The switch includes an identifier management module and a flow definition management module. During operation, the identifier management module allocates a logical identifier to a link aggregation port group which includes a plurality of ports associated with different links. The flow definition management module processes a flow definition corresponding to the logical identifier, applies the flow definition to ports in the link aggregation port group, and update lookup information for the link aggregation port group based on the flow definition.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed.

When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   identifier management circuitry configured to create a mapping between a logical identifier identifying a link aggregation port group and a respective port participating in the port group, wherein the port group includes a plurality of ports associated with different links; and
   flow definition management circuitry configured to:
      identify a first flow definition comprising a rule and the logical identifier, wherein the rule indicates how a flow is processed based on the logical identifier;
      identify one or more ports of the switch corresponding to the logical identifier based on the mapping;
      convert the first flow definition to a second flow definition applicable to the identified one or more ports of the switch; and
      apply the second flow definition to traffic associated with the identified one or more ports.

2. The switch of claim 1, wherein the flow definition management circuitry is further configured to incorporate, in the second flow definition, a local policy regarding traffic distribution across the identified local ports.

3. The switch of claim 1, further comprising high-availability circuitry configured to:
   detect a failure associated with one of the identified local ports;
   identify active ports in the identified one or more ports; and
   update lookup information to associate the second flow definition with the identified active ports.

4. The switch of claim 1, wherein the logical identifier appears as a port identifier in the first flow definition.

5. A switch, comprising:
   identifier management circuitry configured to create a mapping between a logical identifier identifying a multi-switch link aggregation port group and a respective port participating in the port group, wherein the port group includes a plurality of ports of the switch and a remote switch;
   election circuitry configured to elect a master switch between the switch and the remote switch, wherein the switch and the remote switch participate in the multi-switch link aggregation port group, and wherein the master switch is responsible for obtaining flow definitions for the port group;
   wherein the logical identifier is same in the switch and the remote switch; and
   flow definition management circuitry configured to identify a first flow definition comprising a rule and the logical identifier, wherein the first flow definition is received based on a data path identifier, which identifies the switch to a controller, and wherein the rule indicates how a flow is processed based on the logical identifier.

6. The switch of claim 5, wherein the flow definition management circuitry is further configured to:
   identify one or more ports of the switch corresponding to the logical identifier based on the mapping;
   convert the first flow definition to a second flow definition applicable to the identified one or more ports; and
   apply the second flow definition to traffic associated with the identified one or more ports.

7. The switch of claim 5, further comprising synchronization circuitry configured to, in response to the switch being the master switch, construct, for the remote switch, a message comprising the data path identifier.

8. The switch of claim 5, further comprising synchronization circuitry configured to, in response to the remote switch being the master switch, identify the first flow definition in a message from the remote switch.

9. The switch of claim 8, further comprising high-availability circuitry configured to detect a failure associated with the remote switch; and
   wherein the flow definition management circuitry is further configured to, in response to the detection of the failure, construct a connection request destined to the network controller based on the data path identifier.

10. The switch of claim 8, wherein the flow definition management circuitry is further configured to, in response to identifying a take-over message from the remote switch, construct a connection request destined to the network controller based on the data path identifier, wherein the take-over message instructs the switch to operate as the master switch.

11. A computer-executable method, comprising:
    creating at a switch a mapping between a logical identifier identifying a link aggregation port group and a respective port participating in the port group, wherein the port group includes a plurality of ports associated with different links;
    identifying a first flow definition comprising a rule and the logical identifier, wherein the rule indicates how a flow is processed based on the logical identifier;
    identifying one or more ports of the switch corresponding to the logical identifier based on the mapping;
    converting the first flow definition to a second flow definition applicable to the identified one or more ports of the switch; and
    applying the converted flow definition to traffic associated with the identified one or more ports.

12. The method of claim 11, further comprising incorporating, in the second flow definition, a local policy regarding traffic distribution across the identified one or more ports.

13. The method of claim 11, further comprising:
    detecting a failure associated with one of the identified local ports;
    identifying active ports in the identified one or more ports; and
    updating lookup information to associate the second flow definition with the identified active ports.

14. The method of claim 11, wherein the logical identifier appears as a port identifier in the first flow definition.

15. A computer-executable method, comprising:
    creating at a first switch a mapping between a logical identifier identifying a multi-switch link aggregation port group and a respective port participating in the port group, wherein the port group includes a plurality of ports of the first switch and a second switch;

electing a master switch between the first switch and the second switch, wherein the first switch and the second switch participate in the multi-switch link aggregation port group, and wherein the master switch is responsible for obtaining flow definitions for the port group;

wherein the logical identifier is same in the first switch and the second switch; and identifying a first flow definition comprising a rule and the logical identifier, wherein the first flow definition is received based on a data path identifier, which identifies the switch to a controller, and wherein the rule indicates how a flow is processed based on the logical identifier.

16. The method of claim 15, further comprising:

identifying one or more ports of the first switch corresponding to the logical identifier based on the mapping;

converting the first flow definition to a second flow definition applicable to the identified one or more ports; and applying the second flow definition to traffic associated with the identified one or more ports.

17. The method of claim 15, further comprising:

in response to the first switch being the master switch, constructing, for the second switch, a message comprising the data path identifier.

18. The method of claim 15, further comprising, in response to the second switch being the master switch, identifying the first flow definition in a message from the second switch.

19. The method of claim 18, further comprising:

detecting a failure associated with the second switch; and in response to the detection of the failure, constructing a connection request destined to the network controller based on the data path identifier.

20. The method of claim 15, wherein, in response to identifying a take-over message from the second switch, constructing a connection request destined to the network controller based on the data path identifier, wherein the take-over message instructs the first switch to operate as the master switch.

* * * * *